United States Patent
Saruyama et al.

(10) Patent No.: US 11,443,081 B2
(45) Date of Patent: Sep. 13, 2022

(54) PART PROCUREMENT SYSTEM AND PART PROCUREMENT METHOD

(71) Applicant: Hitachi Construction Machinery Co., Ltd., Tokyo (JP)

(72) Inventors: Mika Saruyama, Tsuchiura (JP); Ayato Iwasaki, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 334 days.

(21) Appl. No.: 16/491,007

(22) PCT Filed: Sep. 18, 2018

(86) PCT No.: PCT/JP2018/034452
§ 371 (c)(1),
(2) Date: Sep. 4, 2019

(87) PCT Pub. No.: WO2019/065364
PCT Pub. Date: Apr. 4, 2019

(65) Prior Publication Data
US 2020/0012759 A1    Jan. 9, 2020

(30) Foreign Application Priority Data

Sep. 29, 2017   (JP) .............................. JP2017-190341

(51) Int. Cl.
*G06F 30/17*       (2020.01)
*G06Q 10/06*      (2012.01)
(Continued)

(52) U.S. Cl.
CPC ......... *G06F 30/17* (2020.01); *G06Q 10/0635* (2013.01); *G06Q 10/087* (2013.01); *G06Q 10/20* (2013.01); *G06F 2111/20* (2020.01)

(58) Field of Classification Search
CPC ...... G06F 30/17; G06F 2111/20; G06F 30/00; G06Q 10/0635; G06Q 10/087;
(Continued)

(56) References Cited

U.S. PATENT DOCUMENTS

| 6,289,254 B1 | 9/2001 | Shimizu et al. |
| 2001/0037341 A1 | 11/2001 | Kimoto et al. |

(Continued)

FOREIGN PATENT DOCUMENTS

| CN | 101373481 A | * 2/2009 | ......... G06Q 30/0643 |
| CN | 105930561 A | * 9/2016 | ........... G06F 30/367 |

(Continued)

OTHER PUBLICATIONS

Korean Office Action dated Sep. 21, 2020, issued in corresponding Korean Patent Application No. 10-2019-7025127.
(Continued)

*Primary Examiner* — Kandasamy Thangavelu
(74) *Attorney, Agent, or Firm* — Mattingly & Malur, PC

(57) ABSTRACT

In a part procurement system including a control device performing procurement of a part required by a customer, to the control device, customer's requirements information about the procured part inputted via a data input device, and at least BOM information that is part table information, CAD information that is computer-aided design information and part compatibility information, which are stored in a file server, are inputted; and the control device extracts candidate parts including candidates for the part required by the customer and alternatives for the part, based on the BOM information, the CAD information and the part compatibility information that have been inputted, and outputs a signal for displaying the extracted candidate parts on a display device.

8 Claims, 18 Drawing Sheets

(51) Int. Cl.
*G06Q 10/08* (2012.01)
*G06Q 10/00* (2012.01)
*G06F 111/20* (2020.01)

(58) Field of Classification Search
CPC ........ G06Q 10/20; G06Q 10/08; G06Q 50/10;
G06Q 10/06312; G06Q 10/10; G06Q
30/06; G06Q 10/00; G06Q 30/0643;
G05B 19/418; Y02P 90/30
See application file for complete search history.

(56) References Cited

U.S. PATENT DOCUMENTS

| | | |
|---|---|---|
| 2010/0023366 A1 | 1/2010 | Budnik et al. |
| 2015/0134400 A1 | 5/2015 | Kashi |
| 2016/0078403 A1 | 3/2016 | Sethi et al. |
| 2016/0210685 A1 | 7/2016 | Batcheller et al. |

FOREIGN PATENT DOCUMENTS

| | | | | |
|---|---|---|---|---|
| JP | 10-207931 | A | | 8/1998 |
| JP | 2000-113051 | A | | 4/2000 |
| JP | 2000-259729 | A | | 9/2000 |
| JP | 2002092349 | A * | 3/2002 | |
| JP | 2002-304394 | A | | 10/2002 |
| JP | 2004094340 | A * | 3/2004 | ............. Y02P 90/30 |
| JP | 2006163843 | A * | 6/2006 | ........... G06Q 10/087 |
| JP | 3794044 | B2 * | 7/2006 | |
| JP | 2006-227664 | A | | 8/2006 |
| JP | 2006251869 | A * | 9/2006 | ............. G06Q 10/00 |
| JP | 3873010 | B2 * | 1/2007 | ............. Y02P 90/30 |
| JP | 2007-213525 | A | | 8/2007 |
| JP | 2010231408 | A * | 10/2010 | ............. Y02P 90/30 |
| JP | 2012-128555 | A | | 7/2012 |
| JP | 2014149673 | A * | 8/2014 | ............. Y02P 90/30 |
| JP | 2017102651 | A * | 6/2017 | ............. G06Q 30/06 |
| KR | 2001-0082651 | A | | 8/2001 |
| WO | WO 03001310 | A2 * | 1/2003 | ....... G05B 19/41805 |
| WO | 2006/106587 | A1 | | 10/2006 |
| WO | 2013/186874 | A1 | | 12/2013 |

OTHER PUBLICATIONS

International Search Report of PCT/JP2018/034452 dated Dec. 11, 2018.
Extended European Search Report received in corresponding European Application No. 18860721.2 dated July 30, 2021.

* cited by examiner

PART PROCUREMENT SYSTEM AND PART PROCUREMENT METHOD

TECHNICAL FIELD

The present invention relates to a part procurement system and a part procurement method for procuring a service part for a construction machine.

BACKGROUND ART

Maintenance, inspection and repair of a construction machine are performed by servicemen of an agency for the construction machine. When trouble occurs in the construction machine, construction and work are interrupted. Therefore, the servicemen make efforts to quickly cope with the malfunction to shorten downtime as far as possible. However, a construction machine often operates at a remote place away from an agency where servicemen are present, and it is often difficult for the servicemen to cope with the malfunction immediately.

Further, since construction machines are expensive and large in comparison with general work machines, models and the number of machines for each of the models that are stored in an agency or the like, and models and the number of machines for each of the models that can be rented from the agency or the like are limited. From such a point of view that models and the number of machines are limited, it is difficult to, when trouble occurs in a construction machine, immediately put an alternative construction machine at a construction site.

Conventionally, there have been cases where temporary emergency measures are taken to eliminate such construction and work interruption as far as possible. A method for shortening time required until a part required to solve trouble are procured has been considered. For example, Patent Document 1 discloses a technique for, in order to quickly solve trouble of a construction machine, estimating a position of the trouble from operation information and sensor information about the construction machine. Furthermore, Patent Document 2 discloses a technique for detecting a sign before occurrence of trouble from operation information and sensor information about a construction machine and planning beforehand stock allocation of parts for measures to cope with the trouble.

PRIOR ART DOCUMENT

Patent Document

Patent Document 1: Japanese Patent Laid-Open No. 2000-259729
Patent Document 2: International Publication No. WO2013/186874

SUMMARY OF THE INVENTION

Problems to be Solved by the Invention

However, there are a large number of models of construction machines, and uses of the construction machines are various. Therefore, it is difficult to identify all troubles from operation information and sensor information, and it is difficult to sufficiently shorten down time. It is conceivable to quickly cope with trouble of a construction machine using stock parts of an agency. However, it is difficult for the agency to store many kinds of parts in order to cope with all troubles, in terms of storage space and cost.

The present invention has been made in view of such a problem, and an object of the present invention is to provide a part procurement system and a part procurement method capable of quickly coping with various malfunctions of a construction machine and shortening down time.

Means for Solving the Problems

In order to achieve the object described above, a part procurement system of the present invention is a part procurement system including a control device performing procurement of a part required by a customer, wherein, to the control device, customer's requirements information about the procured part inputted via a data input device, and at least BOM information that is part table information, CAD information that is computer-aided design information and part compatibility information, which are stored in a file server, are inputted; and the control device extracts candidate parts including candidates for the part required by the customer and alternatives for the part, based on the BOM information, the CAD information and the part compatibility information that have been inputted, and outputs a signal for displaying the extracted candidate parts on a display device.

In order to achieve the object described above, a part procurement method of the present invention is a part procurement method for procuring a part required by a customer, the part procurement method including: an input step of inputting customer's requirements information about the procured part inputted via a data input device, and at least BOM information that is part table information, CAD information that is computer-aided design information and part compatibility information, which are stored in a file server; a candidate part extraction step of extracting candidate parts including candidates for the part required by the customer and alternatives for the part, based on the BOM information, the CAD information and the part compatibility information that have been inputted at the input step; and an output step of outputting a signal for displaying the candidate parts extracted at the candidate part extraction step on a display device.

Advantageous Effects of the Invention

According to a part selection display system according to the present invention, it is possible to quickly cope with various malfunctions of a construction machine and shorten down time.

MODE FOR CARRYING OUT THE INVENTION

An embodiment of a part procurement system according to the present invention will be described below based on examples with reference to drawings. The present invention is not limited to content described below and can be arbitrarily changed and practiced in a range not changing the spirit of the invention. Each of all of various numerical values used in the embodiment shows an example and can be variously changed as needed.

Figure 1:
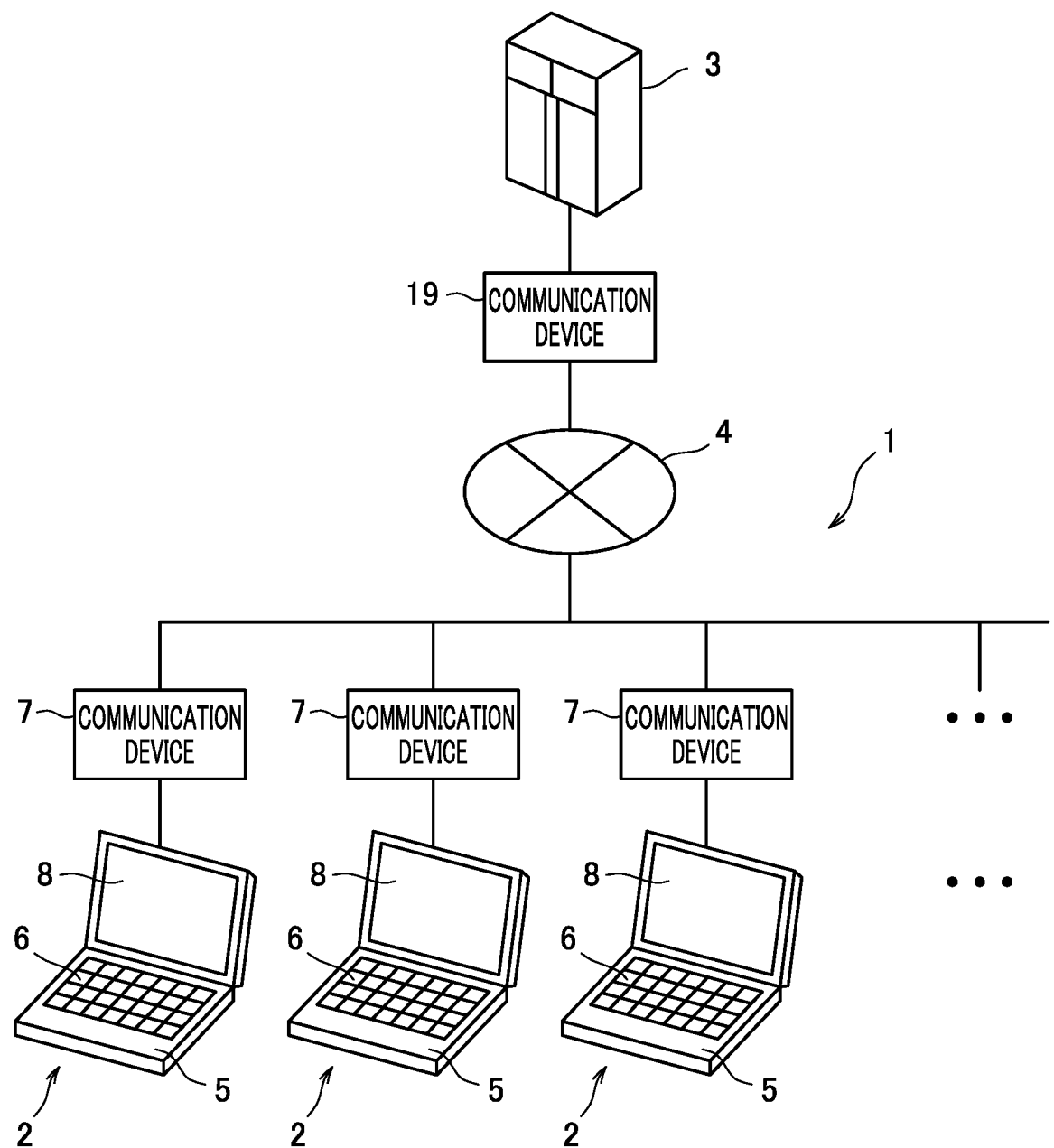
FIG. 1 is a configuration block diagram of a part procurement system according to an embodiment of the present invention.
Figure 2:
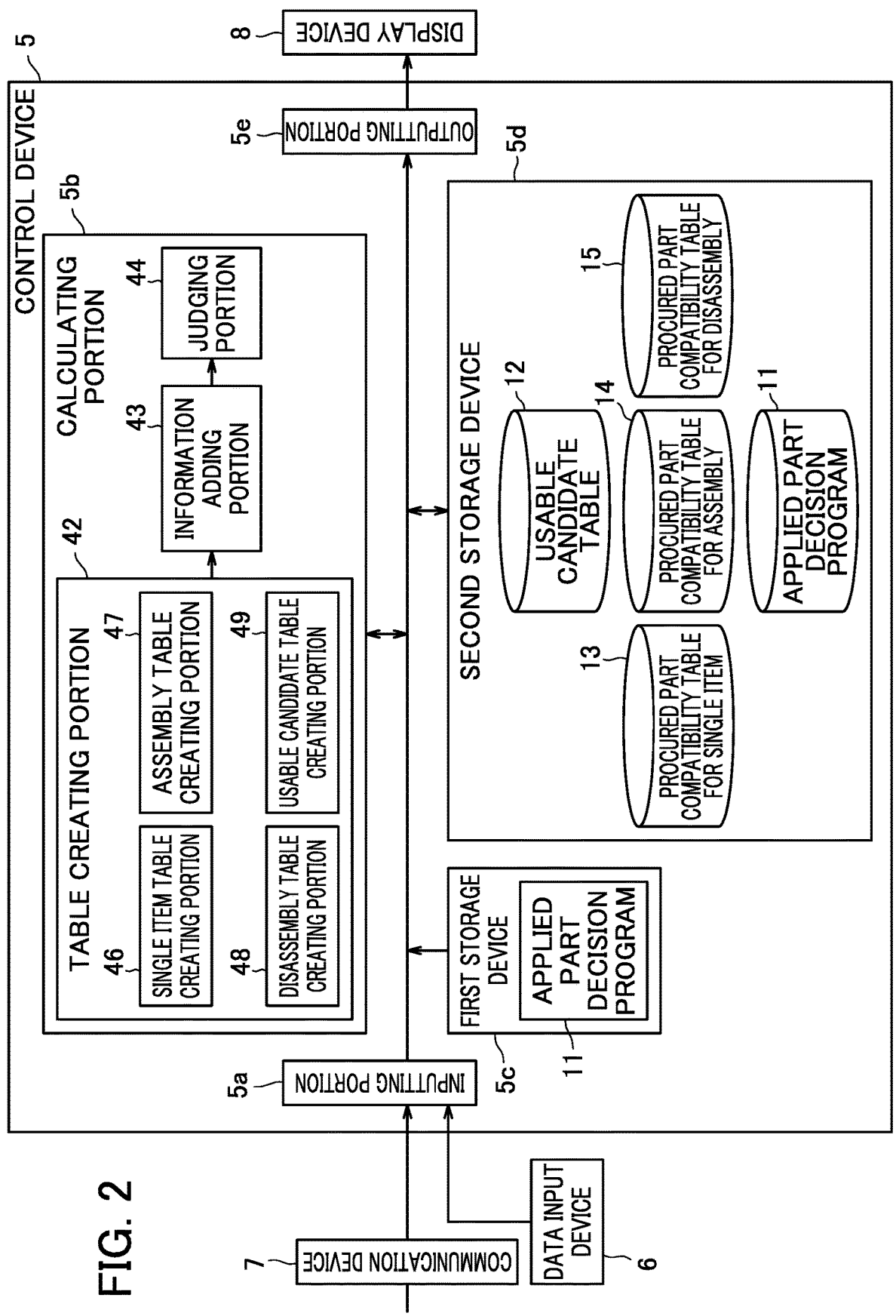
FIG. 2 is a configuration block diagram of a terminal of the part procurement system according to the embodiment of the present invention.
Figure 3:
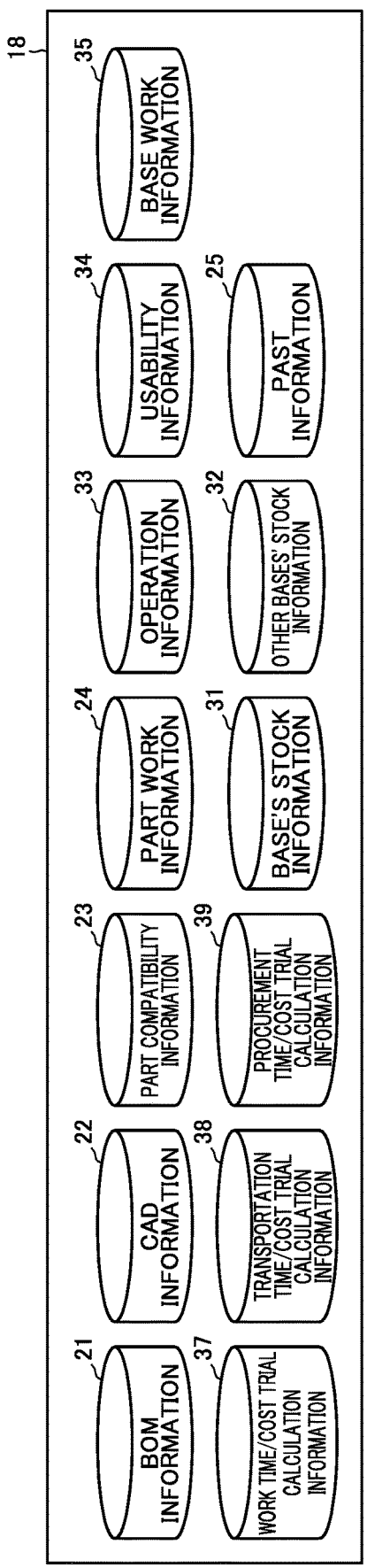
FIG. 3 is a diagram showing a file storage state of a file server of the part procurement system according to the present embodiment.

A configuration of a part procurement system 1 according to the present embodiment will be described below with reference to FIGS. 1 to 3. Here, FIG. 1 is a configuration block diagram of the part procurement system 1 according the present embodiment. FIG. 2 is a configuration block diagram of a terminal of the part procurement system 1 according the present embodiment. Furthermore, FIG. 3 is a diagram showing a file storage state of a file server according to the present embodiment.

As shown in FIG. 1, the part procurement system 1 according to the present embodiment has terminals 2 that perform an actual part procurement process, a file server 3 that stores information about various kinds of parts and a communication network 4 enabling the terminals 2 and the file server 3 to communicate in both directions. Here, as the communication network 4, for example, a dedicated line network, IP-VPN network or the Internet is used. Each of the terminals 2 in FIG. 1 is installed in an agency in each area.

As seen from FIGS. 1 and 2, the terminal 2 is provided with a control device 5 that performs control of the terminal itself and procurement of a part required by a customer, a data input device 6 for inputting various kinds of information, a communication device 7 for connecting to the communication network 4, and a display device 8 for displaying various kinds of information. As the data input device 6, for example, a keyboard and a mouse are used. As the display device 8, any of various kinds of common displays is used. An output device such as a printer that outputs a result displayed on the display device 8 may be further provided.

As shown in FIG. 2, the control device 5 is configured with an inputting portion 5a to which various kinds of information is inputted from the data input device 6 and communication device 7 that are connected, a calculating portion (CPU: central processing unit) 5b that performs various kinds of arithmetic processing, a first storage device (ROM: read only memory) 5c in which programs are stored, a second storage device (RAM: random access memory) 5d in which various kinds of tables are stored, and an outputting portion 5e that outputs display data to the display device 8 that is connected.

As shown in FIG. 2, the calculating portion 5b is configured with a table creating portion 42, an information adding portion 43 and a judging portion 44. The table creating portion 42 of the part procurement system 1 includes a single item table creating portion 46, an assembly table creating portion 47, a disassembly table creating portion 48 and an usable candidate table creating portion 49.

As shown in FIG. 2, an applied part decision program 11 for deciding a part to be ordered for a part that is required is stored in the first storage device 5c.

Here, the part that is required refers to a part to be procured (hereinafter also referred to as a procured part, a required part or an ordered part). The part that is required is not limited to a part that is actually missing, but a part that is not missing but is judged to be stored as stock is also included. The part to be ordered is not limited to a required part itself, but an alternative part and an upper part that includes the required part are also included.

In the second storage device 5d, procured part compatibility tables created by executing the applied part decision program 11 stored in the first storage device 5c and an usable candidate table 12 created based on the procured part compatibility tables are stored. Here, the procured part compatibility tables include a procured part compatibility table for single item 13 about a single-item part, a procured part compatibility table for assembly 14 about an assembly part and a procured part compatibility table for disassembly 15 including information about relationships between an assembly part and disassembled parts.

As shown in FIG. 1, the file server 3 is provided with a storage device 18, a communication device 19 and a central processing unit (not shown) that controls these devices and the like. In the storage device 18, various information about various kinds of parts, various information about each base (agency) and various information about various kinds of costs are stored. In the present embodiment, as the various information about the various kinds of parts, bill of materials (hereinafter referred to as BOM) information 21, computer-aided design (hereinafter referred to as CAD) information 22, part compatibility information 23, part work information 24 and past information 25 are stored. As the various information about the various kinds of bases, base's stock information 31, other bases' stock information 32, operation information 33, usability information 34 and base work information 35 are stored. Furthermore, as the various information about the various kinds of costs, work time/cost trial calculation information 37, transportation time/cost trial calculation information 38 and procurement time/cost trial calculation information 39 are stored.

The base's stock information 31 and the other bases' stock information 32 are stored as one piece of stock information, and the one piece of stock information is divided into stock information about a base and stock information about other bases according to a terminal 2 that accesses the file server 3.

Therefore, in the part procurement system 1 according to the present embodiment, the calculating portion 5b of each terminal 2 executes the applied part decision program 11 and creates the procured part compatibility tables and the usable candidate table 12 using the various kinds of information stored in the file server 3. After that, the calculating portion 5b of the terminal 2 further uses the various kinds of information stored in the file server 3 to extract candidates satisfying requirements for a procured part according to priority order and displays a result of the extraction on the display device 8. Then, a part orderer, who is an operator of the terminal 2, selects a part to be ordered, from the extraction result, and ordering for the procured part is completed.

The information stored in the storage device 18 of the file server 3 may be stored in the second storage device 5d of the terminal 2. That is, the terminal 2 may periodically acquire various kinds of information from the file server 3 by communication via the communication network 4 and store the various kinds of information into the second storage device 5d. Thereby, it becomes possible to execute the applied part decision program 11 without performing communication between the terminal 2 and the file server 3. In such a case, the part procurement system 1 is configured only with the terminal 2.

Next, functions of the part procurement system 1 according to the present embodiment will be described with reference to FIG. 2.

The inputting portion 5a of the control device 5 inputs customer's requirements information about a procured part inputted to the data input device 6 and various kinds of information stored in the file server 3 (including at least the BOM information 21, the CAD information 22 and the part compatibility information 23). Here, the customer's requirements information includes, for example, a part number, a quantity, a delivery deadline, a required price and a required quality. In the present embodiment, such requirements information as shown in Table 1 below is inputted by the inputting portion 5a.

TABLE 1

| INPUT DATA OF PROCURED PART | | | | | | |
|---|---|---|---|---|---|---|
| RECEIVED ORDER NUMBER | PART NUMBER | PART NAME | QUANTITY | DELIVERY DEADLINE | REQUIRED PRICE | REQUIRED QUALITY |
| 1N204 | AssyA | SEAL KIT | 1 | 2017 Mar. 4 | 10000 | GENUINE |

In Table 1, a received order number is an automatically assigned number. A part name is also automatically displayed by inputting the part number. The part number may be adapted to be automatically displayed by inputting a part name.

Here, a part number, a quantity, a delivery deadline, a required price and a required quality may be directly inputted from the data input device 6 such as a keyboard or may be inputted by checking predetermined checkboxes using a mouse. For example, as for the required quality, "non-genuine part usable", "decrease in durability allowed", "processing by grinder and the like at site allowed" and "different appearance allowed" are set as quality choices in advance as shown in Table 2 below, and a required quality of a part is selected by the operator of the terminal 2 checking any of checkboxes corresponding to the quality choices. The required quality is not limited to the above. Various requirements may be set according to the classification of the procured part. Furthermore, the operator of the terminal 2 may be able to newly input a requirement. Though the quality choices are displayed on the display device 8, selection may be performed in a pull-down method.

TABLE 2

| QUALITY CHECKBOX | |
|---|---|
| QUALITY CHOICES | CHECKMARK |
| NON-GENUINE PART USABLE | |
| DECREASE IN DURABILITY ALLOWED | ✓ |
| PROCESSING BY GRINDER AND THE LIKE AT SITE ALLOWED | ✓ |
| DIFFERENT APPEARANCE ALLOWED | ✓ |

The table creating portion 42 creates the usable candidate table 12 from requirements information about the procured part inputted from outside and various information about various kinds of parts. Specifically, the table creating portion 42 creates various kinds of procured part compatibility tables from the BOM information 21, the CAD information 22 and the part compatibility information 23 in the file server 3, and creates the usable candidate table 12 based on the created procured part compatibility tables.

More specifically, if the required part is a single-item part, the single item table creating portion 46 creates the procured part compatibility table for single item 13 based on the BOM information 21, the CAD information 22, the part compatibility information 23 and the part work information 24. Further, if the required part is an assembly part, the single item table creating portion 46 also creates the procured part compatibility table for single item 13 for each single-item part constituting the assembly part, based on the BOM information 21, the CAD information 22, the part compatibility information 23 and the part work information 24. For example, the procured part compatibility table for single item 13 has such items as shown in Table 3 below.

TABLE 3

PROCURED PART COMPATIBILITY TABLE FOR SINGLE ITEM/PROCURED PART COMPATIBILITY TABLE FOR ASSEMBLY

| PROCURED PART | ALTERNATIVE | WORK TARGET | WORK | NECESSARY SKILL | NECESSARY TOOL |
|---|---|---|---|---|---|
| XXX | XXX | XXX | XXX | XXX | XXX |

Furthermore, if the required part is an assembly part, the assembly table creating portion 47 creates the procured part compatibility table for assembly 14 based on the BOM information 21, the CAD information 22, the part compatibility information 23 and the part work information 24. For example, the procured part compatibility table for assembly 14 has such items as shown in Table 3 above and has the same configuration as the procured part compatibility table for single item 13. Specific data inputted to each table will be described later (with reference to FIG. 6 and the like). Specific data inputted to each of Tables 4 and 5 shown later will be similarly described later.

Then, if a part that includes the required part exists (that is, if an upper part/product exists), the disassembly table creating portion 48 creates the procured part compatibility table for disassembly 15 based on the BOM information 21 and the part work information 24. For example, the procured part compatibility table for disassembly 15 has such items as shown in Table 4 below.

[Table 4]

TABLE 4

PROCURED PART COMPATIBILITY TABLE FOR DISASSEMBLY

| PROCURED PART | ALTERNATIVE | WORK TARGET | ADDITIONAL WORK | NECESSARY SKILL | NECESSARY TOOL |
|---|---|---|---|---|---|
| XXX | XXX | XXX | XXX | XXX | XXX |

The usable candidate table creating portion 49 creates the usable candidate table 12, which is a table in which candidates (including alternative candidates) for preparing the part required to be procured are enumerated, from the procured part compatibility table for single item 13, the procured part compatibility table for assembly 14 and the procured part compatibility table for disassembly 15 created by the table creating portions. For example, the usable candidate table 12 has such items as shown in Table 5 below.

The information adding portion 43 adds a candidate number, stock information about the procured part (fields of "content of candidate", "used part", "number used", "ordered part", and "kind of order"), additional work information (fields of "work target", "work", "quantity", "necessary skills" and "necessary tools"), costs (fields of "cost a", "cost b" and "total cost"), and lead times (fields of "LTa", "LTb" and "total LT") to the usable candidate table 12 created by the usable candidate table creating portion 49. That is, the information adding portion 43 performs additional input for the various kinds of items of the usable candidate table 12 based on the base's stock information 31, the other bases' stock information 32, the operation information 33, the usability information 34, the base work information 35, the work time/cost trial calculation information 37, the trial transportation time/cost calculation information 38 and the procurement time/cost trial calculation information 39 in the file server 3. Further, the information adding portion 43 also performs deletion of unnecessary candidates of the usable candidate table 12.

The information adding portion 43 performs calculation of total lead time and total cost on the usable candidate table 12 on which the lead times and the costs are additionally inputted and further additionally inputs numerical values thereof. Specifically, the information adding portion 43 calculates the total LT from LTa and LTb in the items in Table 5 and additionally inputs the total LT to the item of total LT; and calculates the total cost from the cost a and the cost b and additionally inputs the total cost to the item of total cost. As for LTa, LTb, the cost a and the cost b, description will be made later.

The judging portion 44 judges a candidate satisfying requirements for the procured part from the usable candidate

TABLE 5

USABLE CANDIDATE TABLE (NOT ENTERED)

| CANDIDATE NUMBER | CONTENT OF CANDIDATE | USED PART | NUMBER USED | ORDERED PART | KIND OF ORDER | WORK TARGET | WORK | QUANTITY |
|---|---|---|---|---|---|---|---|---|
| XXX | XXX | XXX | XXX | XXX | XXX | XXX | XXX | XXX |

| CANDIDATE NUMBER | LTa | LTb | TOTAL LT | COSTa | COSTb | TOTAL COST | NECESSARY SKILL | NECESSARY TOOL |
|---|---|---|---|---|---|---|---|---|
| XXX | XXX | XXX | XXX | XXX | XXX | XXX | XXX | XXX | table 12 updated by the information adding portion 43. Specifically, the judging portion 44 selects a candidate for procurement of a part in consideration of the requirements information (the quantity, the delivery deadline, the required price and the required quality) inputted by the inputting portion 5a.

If there is not a candidate satisfying the requirements for the procured part or if there are a plurality of such candidates, the judging portion 44 re-extracts candidates of the usable candidate table 12 according to priority order based on information about cost, a delivery deadline (an emergency degree) or quality (whether genuine or not) inputted by the inputting portion 5a and, furthermore, the past information 25 in the file server 3. Here, the past information 25 includes information about which item was prioritized at the time of procuring the required part in the past (that is, past procurement record information). For example, as such priority items, required price, delivery deadline and required quality are given, and the past information 25 is information that makes it possible to grasp which item was prioritized. Further, the past information 25 includes past order record information about items similar to the procured part, past order record information about the same customer as the orderer of the procured part and past order record information about delivery deadlines similar to the delivery deadline of the procured part.

Especially in the present embodiment, the judging portion 44 extracts a list of past trends from the past information 25 in the file server 3 (that is, the past procurement record information, the order record information about similar items, the order record information about the same customer and the order record information about delivery deadlines) and decides priority order of the candidates of the usable candidate table 12 based on priority in the list of past trends. That is, the judging portion 44 extracts procurement records of the required part and parts equal to the required part as a list from the past information 25 in the file server 3, judges which item importance was attached to in the past procurement records, and decides priority order of the candidates of the usable candidate table 12 based on the item which importance was attached to in the past and re-extracts candidates.

Each of the functions of the table creating portion 42, the information adding portion 43 and the judging portion 44 as described above is executed by the calculating portion 5b by starting the applied part decision program 11 stored in the first storage device 5c.

The outputting portion 5e outputs a result of execution of the applied part decision program 11 to the display device 8. That is, the outputting portion 5e outputs a signal for displaying one candidate that is optimal as a candidate for procurement or a plurality of candidates according to priority order on the display device 8 from the usable candidate table 12 created by the table creating portion 42. Here, if a plurality of candidates are displayed on the display device 8, the operator of the terminal 2 selects one candidate according to the requirements, and ordering for the procured part is completed.

The part procurement system 1 may have an update function for updating each of the created tables (that is, an updating portion). Thereby, it is possible to store the latest tables into the second storage device 5d, and it becomes possible to present candidates that are optimal as candidates for procurement without performing creation of tables, information addition and judgment.

Overall Flow of Part Procurement Method

Next, a part procurement method by the part procurement system 1 according to the present embodiment will be described in detail with reference to FIGS. 4 to 18. First, an overall flow of the part procurement method will be described with reference to FIG. 4. Here, FIG. 4 is an overall flowchart of the part procurement method by the part procurement system 1 according the present embodiment.

Figure 4:
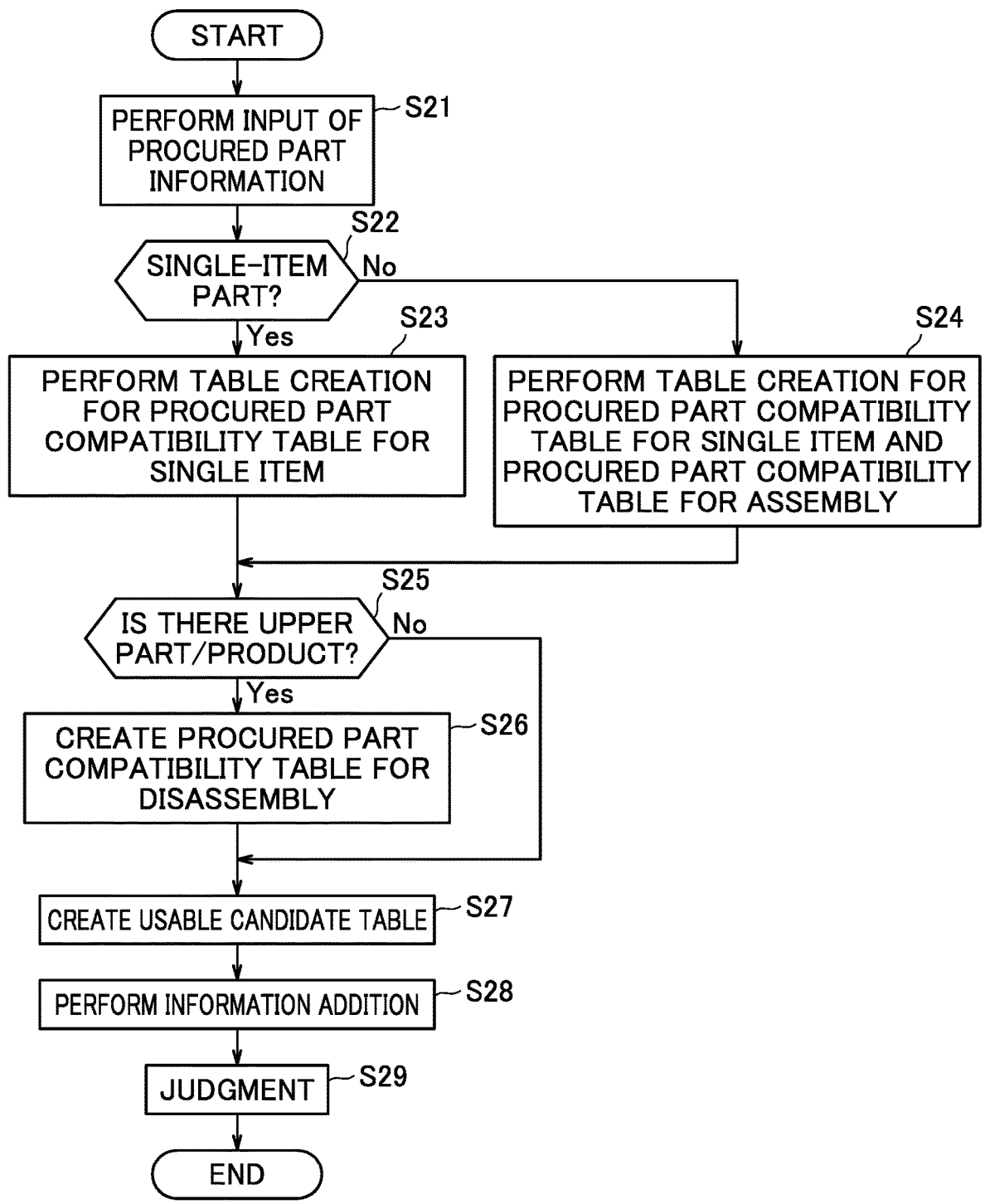
FIG. 4 is an overall flowchart of a part procurement method by the part procurement system according to the embodiment of the present invention.

As shown in FIG. 4, input of procured part information is performed (step S21). Specifically, the operator of the terminal 2 operates the data input device 6 to input various kinds of information. At this time, various kinds of information stored in the file server 3 are also inputted via the communication device 7. That is, the input step of inputting customer's requirements information about a procured part and various kinds of information stored in the file server 3 by the inputting portion 5a is performed. The various kinds of information inputted from the file server 3 include at least the BOM information 21, the CAD information 22 and the part compatibility information 23.

Next, a judgment about whether the procured part is a single-item part or not is made (step S22). If the procured part is a single-item part (step S22: Yes), the flow proceeds to step S23, where table creation for creating the procured part compatibility table for single item 13 is performed. On the other hand, if the procured part is not a single-item part, that is, if the procured part is an assembly part (step S22: No), the flow proceeds to step S24, where table creation for creating the procured part compatibility table for single item 13 and the procured part compatibility table for assembly 14 is performed.

After the procured part compatibility table for single item 13 is created at step S23, or after the procured part compatibility table for single item 13 and the procured part compatibility table for assembly 14 are created at step S24, a judgment about whether an upper part/product provided with the procured part exists or not is made (step S25). If an upper part/product of the procured part exists (step S25: Yes), the flow proceeds to step S26, where disassembly table creation for creating the procured part compatibility table for disassembly 15 is performed.

If it is judged at step S25 that an upper part/product does not exist (step S25: No), and after the procured part compatibility table for disassembly 15 is created, candidate table creation for creating the usable candidate table 12 is performed based on the created procured part compatibility tables (step S27).

Specifically, various kinds of information are added to the items of Table 5, and a state of Table 6 below is obtained. The series of flows from steps S22 to S27 is implemented by the table creating portion 42 by the applied part decision program 11 being executed.

TABLE 6

| | | USABLE CANDIDATE TABLE (STEP S27) | | | | | |
|---|---|---|---|---|---|---|---|
| CANDIDATE NUMBER | CONTENT OF CANDIDATE | USED PART | NUMBER USED | ORDERED PART | KIND OF ORDER | WORK TARGET | WORK |
| 1 | URGENTLY ORDER AssyA | AssyA | 1 | AssyA | URGENT | | |

TABLE 6-continued

USABLE CANDIDATE TABLE (STEP S27)

| | | | | | | | | | |
|---|---|---|---|---|---|---|---|---|---|
| 2 | NORMALLY ORDER AssyA | AssyA | 1 | | AssyA | NORMAL | | | |
| 3 | USE AssyG (TO CUT 20B) | AssyG | 1 | | | | | 20B | CUTTING |
| 4 | ORDER/USE AssyG (TO CUT 20B) | AssyG | 1 | | | NORMAL | | 20B | CUTTING |
| 4 | ADD 002 TO AssyG | AssyG 002 | 1 2 | | | | | | ADDITION |
| 5 | FABRICATE ASSEMBLY PART | 00B 00C | 2 1 | | | | | | ASSEMBLY |
| . | | | | | | | | | |
| . | | | | | | | | | |
| . | | | | | | | | | |
| n | ACQUIRE FROM NON-OPERATIONAL MACHINE | | | | | | | NO. XX1-30001 | DISMANTLING |

| CANDIDATE NUMBER | QUANTITY | LTa | LTb | TOTAL LT | COSTa | COSTb | TOTAL COST | NECESSARY SKILL | NECESSARY TOOL |
|---|---|---|---|---|---|---|---|---|---|
| 1 | 1 | | | | | | | | |
| 2 | 1 | | | | | | | | |
| 3 | 2 | | | | | | | SAFETY QUALIFICATION A | GRINDER WORKPLACE |
| 4 | 2 | | | | | | | SAFETY QUALIFICATION A | GRINDER WORKPLACE |
| 4 | 1 2 | | | | | | | | |
| 5 | 2 1 | | | | | | | | |
| . | | | | | | | | | |
| . | | | | | | | | | |
| . | | | | | | | | | |
| n | 1 | | | | | | | SAFETY QUALIFICATION B | CRANE WORKPLACE |

When the usable candidate table 12 is created, information addition of performing additional input for items of stock information, additional work information, cost, and lead time and the like for the procured part is performed based on various kinds of information in the file server 3 based on various kinds of information in the file server 3 (step S28). In the information addition, deletion of unnecessary candidates is also performed. Specifically, the various kinds of information are further added to the items of Table 6, and, furthermore, unnecessary candidates are deleted. Then, a state of Table 7 below is obtained.

TABLE 7

USABLE CANDIDATE TABLE (STEP S28)

| CANDIDATE NUMBER | CONTENT OF CANDIDATE | USED PART | NUMBER USED | ORDERED PART | KIND OF ORDER | WORK TARGET | WORK |
|---|---|---|---|---|---|---|---|
| 1 | URGENTLY ORDER AssyA | AssyA | 1 | AssyA | URGENT | | |
| 2 | NORMALLY ORDER AssyA | AssyA | 1 | AssyA | NORMAL | | |
| 3 | ADD 002 TO AssyG | AssyG 002 | 1 2 | | | | |
| 4 | FABRICATE ASSEMBLY PART | 00B 00C | 2 1 | | | | |
| 5 | ACQUIRE FROM NON-OPERATIONAL MACHINE | | | | | NO. XX1-30001 | DISMANTLING |

| CANDIDATE NUMBER | QUANTITY | LTa | LTb | TOTAL LT | COSTa | COSTb | TOTAL COST | NECESSARY SKILL | NECESSARY TOOL |
|---|---|---|---|---|---|---|---|---|---|
| 1 | 1 | 100 | 50 | 150 | 1000 | 50 | 1050 | | |
| 2 | 1 | 1000 | 50 | 1050 | 100 | 50 | 150 | | |
| 3 | | | | | | | | | |
| 4 | | | | | | | | | |

TABLE 7-continued

| USABLE CANDIDATE TABLE (STEP S28) | | | | | | | |
|---|---|---|---|---|---|---|---|
| 5 | 1 | 40 | 40 | 1000 | 1000 | SAFETY QUALIFICATION B | CRANE WORKPLACE |

Here, in Table 7, an urgent order is made for a candidate number 1, and a normal order is made for a candidate number 2. Though the total LT for the candidate number 1 is shorter than the total LT for the candidate number 2, the total cost for the candidate number 1 is higher than the total cost for the candidate number 2. That is, if emergency of the procured part is high, a candidate with a short total LT is preferentially displayed though the cost for the candidate is high.

Then, candidates satisfying requirements for the procured part are judged from the updated usable candidate table 12 (step S29). After that, final candidates for procurement, a result of the judgment, are displayed on the display device 8; one is selected from the candidates for procurement by the operator of the terminal 2; and ordering for the procured part is completed.

Details of Creation of Procured Part Compatibility Table for Single Item

Figure 5:
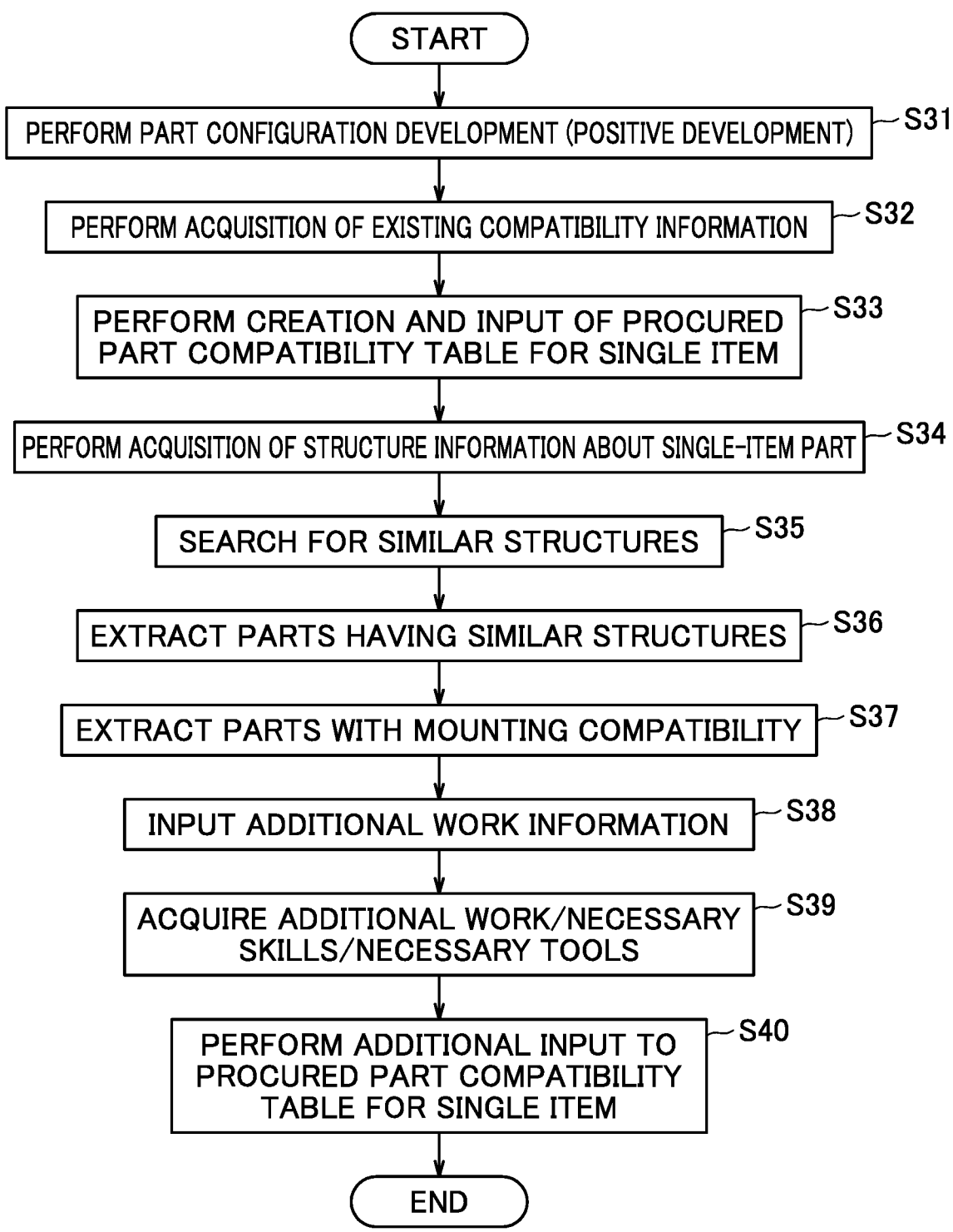
FIG. 5 is a process flowchart in creation of a procured part compatibility table for single item in FIG. 4.
Figure 6:
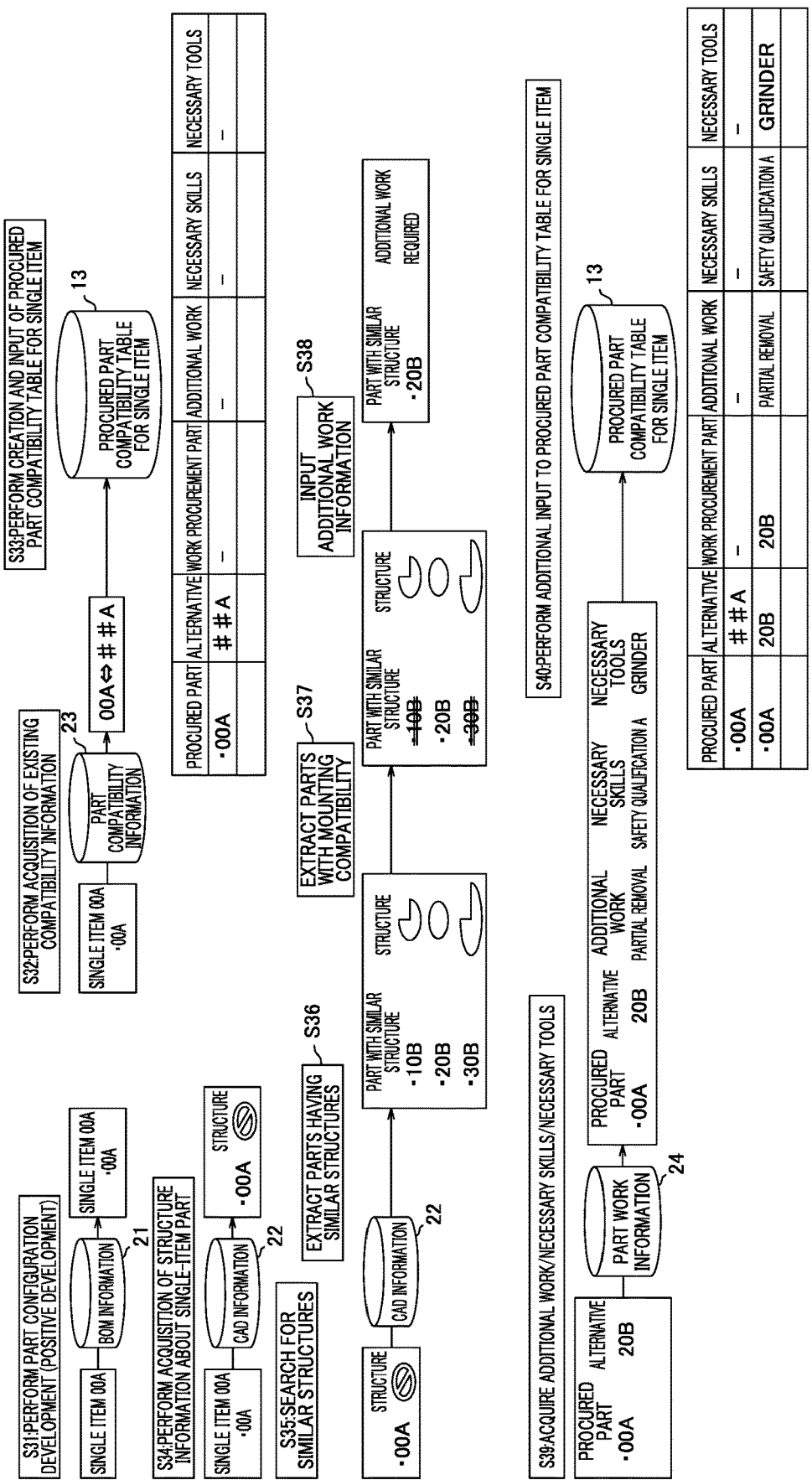
FIG. 6 is a conceptual diagram for illustrating a process flow in the creation of the procured part compatibility table for single item in FIG. 4.

Next, the process in the creation of the procured part compatibility table for single item in FIG. 4 (step S23) will be described in detail with reference to FIGS. 5 and 6. FIG. 5 is a process flowchart in the creation of the procured part compatibility table for single item in FIG. 4 (step S23). FIG. 6 is a conceptual diagram for illustrating a process flow in the creation of the procured part compatibility table for single item in FIG. 4 (step S23).

First, in the case of creating a procured part compatibility table for a single-item part, part configuration development (positive development) is performed (step S31). Specifically, as shown in FIG. 6, part configuration development is performed with reference to the BOM information 21. In the present embodiment, as for "00A", which is a single-item part, a new part is not especially extracted, and only "00A", which is a single-item part, is obtained. Since step S31 overlaps with step S22 in FIG. 4, step S31 may be deleted on the flow in FIG. 5.

Next, acquisition of existing compatibility information about the single-item part, which is the procured part, is performed (step S32). Specifically, as shown in FIG. 6, other parts compatible with the procured part are extracted with reference to the part compatibility information 23. In the present embodiment, a different part "##A" is extracted as a part compatible with "00A" which is a single-item part.

Next, creation and input of the procured part compatibility table for single item 13 are performed (step S33). Specifically, the part inputted at step S21 and the parts extracted at step S32 are inputted in the "procured part" field and the "alternative" field in Table 3 above. In the present embodiment, "00A" is inputted into the "procured part" field, and "##A" is inputted into the "alternative" field.

Next, acquisition of structure information about the single-item part which is the procured part is performed (step S34). Specifically, as shown in FIG. 6, the structure information about the procured part is acquired with reference to the CAD information 22. In the present embodiment, a disc-shaped structure with two holes made in an inner part is acquired as the structure of "00A" which is a single-item part.

Next, parts having structures similar to the structure of the procured part are searched for, using the acquired structure information about the procured part (step S35), and the parts having similar structures are extracted (step S36). Specifically, as shown in FIG. 6, the parts having similar structures to the structure of the procured part are extracted with reference to the CAD information 22. In the present embodiment, "10B" which is an almost disc-shaped part having a notch on a part thereof, "20B" which is a disc-shaped part, and "30B" which is an almost disc-shaped part with dimensions different from those of "10B" are extracted as the parts having structures similar to the structure of "00A" which is a single-item part.

Next, if there are parts (at least one part) judged to have similar structures and extracted at step S36, parts with mounting compatibility are extracted among the parts judged to be similar (step S37). Specifically, CAD information about the procured part and CAD information about the extracted parts are compared, and only parts with mounting compatibility are extracted. In the present embodiment, only "20B" is extracted as a part with mounting compatibility with "00A" which is a single-item part.

Next, if parts (at least one part) with mounting compatibility are extracted at step S37, information about additional work for the parts judged to have mounting compatibility is inputted (step S38). Specifically, if some processing is required for the parts judged to have mounting compatibility, information about the processing is inputted. In the present embodiment, since "20B" which is a disc-shaped part cannot be used as "00A" unless being partially processed to have holes, it is judged that additional work is required, and information about the additional work is inputted. As for a part that is different from the procured part only in color or material, it is judged that additional work is not required, and the information about additional work is not inputted.

Next, when the additional work information is inputted at step S38, information about the additional work, necessary skills and necessary tools for the parts for which the additional work information has been inputted is acquired (step S39). Specifically, as shown in FIG. 6, the information about the additional work, the necessary skills and the necessary tools for the alternative part is acquired with reference to the part work information 24. In the present embodiment, pieces of information of "partial removal", "safety qualification A" and "grinder" are acquired as additional work information, a necessary skill and a necessary tool, respectively.

Next, after the additional work information is acquired at step S39 for all the extracted parts (including a case where the additional work information is not required), additional input to the procured part compatibility table for single item 13 is performed (step S40). Specifically, parts having structures similar to the structure of the procured part as well as with mounting compatibility with the procured part are additionally inputted, and, furthermore, information about additional work and the like for the additionally inputted parts is also additionally inputted. In the present embodiment, "20B" is added to the procured part compatibility table for single item 13 as an alternative part, and various kinds of information such as the additional work is added. Thus, creation of the procured part compatibility table for single item 13 is completed.

On the other hand, if there is not a part having a structure similar to the structure of the procured part (step S36: No), and if there is a part having a structure similar to the structure of the procured part but there is not a part with mounting compatibility (step S37: No), additional input to the procured part compatibility table for single item 13 is not performed, and creation of the procured part compatibility table for single item 13 is completed in the state at step S33.

Details of Procured Part Compatibility Table for Assembly

Figure 7:
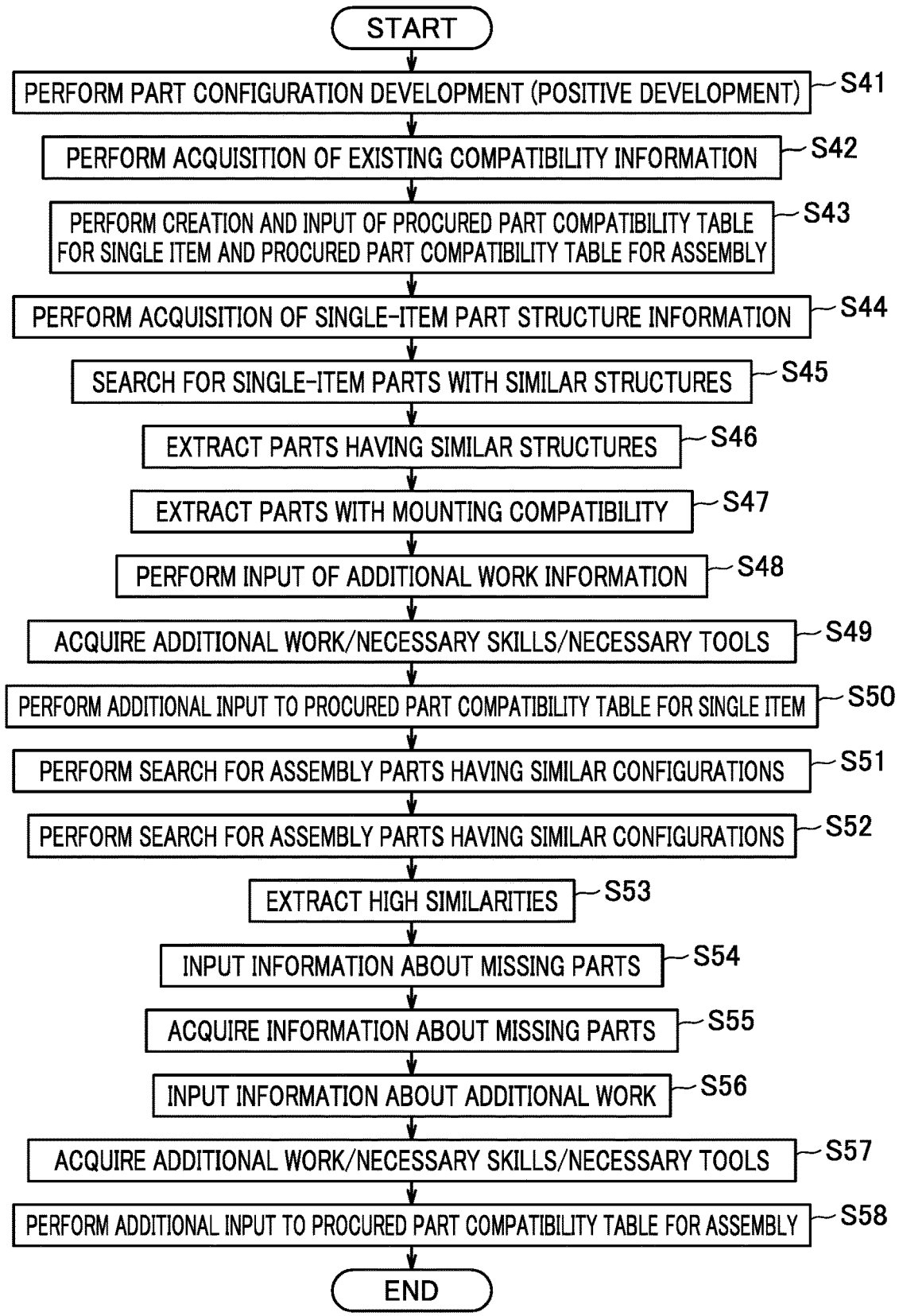
FIG. 7 is a process flowchart in creation of the procured part compatibility table for single item and a procured part compatibility table for assembly in FIG. 4.
Figure 8:
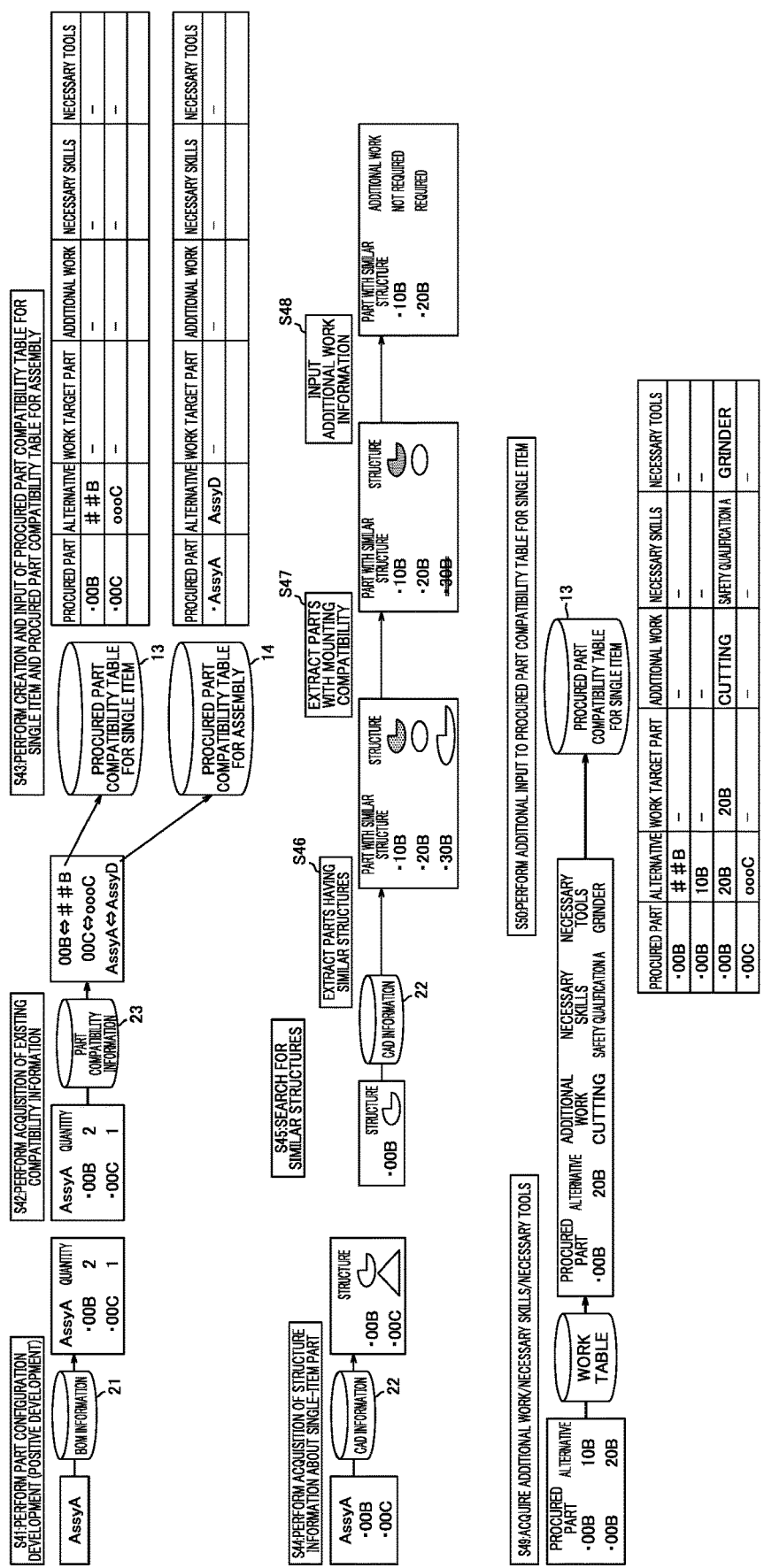
FIG. 8 is a conceptual diagram for illustrating a process flow in the creation of the procured part compatibility table for single item and the procured part compatibility table for assembly in FIG. 4.
Figure 9:
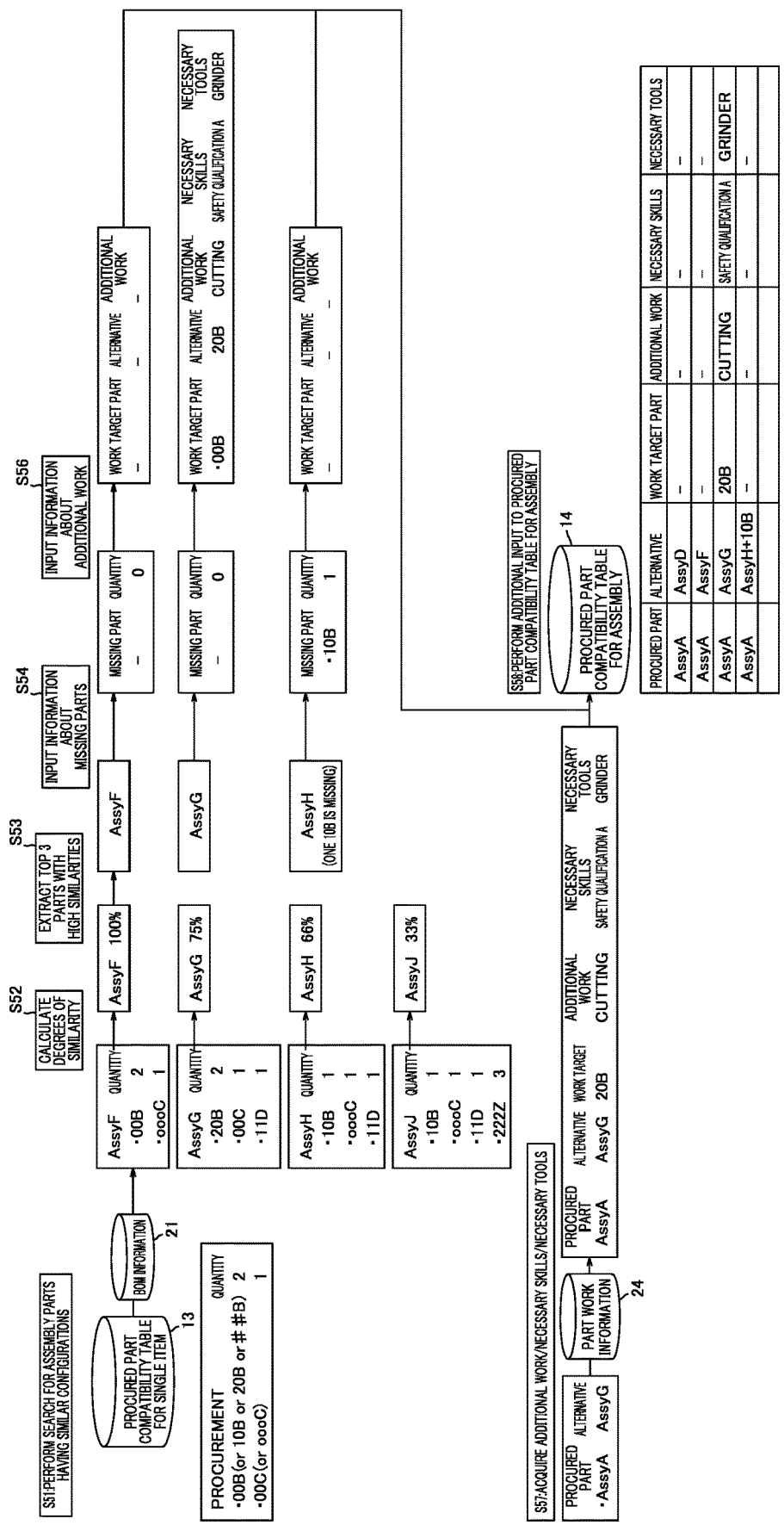
FIG. 9 is a conceptual diagram for illustrating the process flow in the creation of the procured part compatibility table for single item and the procured part compatibility table for assembly in FIG. 4.

Next, the process in the table creation of the procured part compatibility table for single item and the procured part compatibility table for assembly in FIG. 4 (step S24) will be described in detail with reference to FIGS. 7 to 9. FIG. 7 is a process flowchart in creation of the procured part compatibility table for single item and the procured part compatibility table for assembly in FIG. 4 (step S24). FIGS. 8 and 9 are conceptual diagrams for illustrating process flows in the table creation of the procured part compatibility table for single item and procured part compatibility table for assembly in FIG. 4 (step S24).

First, in the case of creating a procured part compatibility table for an assembly part, part configuration development (positive development) is also performed with reference to the BOM information 21 similarly to step S31 (step S41). In the present embodiment, as for "AssyA" which is an assembly part, a result of two "00B's" and one "00C" is obtained as component parts (single-item parts) for "AssyA".

Next, similar to step S32, acquisition of existing compatibility information about the assembly part, which is the procured part, and the component parts of the assembly part is performed with reference to the part compatibility information 23 (step S42). Specifically, as shown in FIG. 8, other assembly parts compatible with the assembly part which is the procured part, and other single-item parts compatible with component parts of the assembly part which is the procured part are extracted. In the present embodiment, "AssyD" is extracted as an assembly part compatible with "AssyA" which is the assembly part; a single-item part "##B" is extracted for "00B" which is a component part of "AssyA"; and a single-item part "000C" is extracted for "00C" which is a component part of "AssyA".

Next, creation and input of the procured part compatibility table for single item 13 and the procured part compatibility table for assembly 14 is performed (step S43). Specifically, the procured part inputted at step S21 and parts compatible with the various kinds of parts extracted at step S42 are inputted into the fields of "procured part" and "alternative" in Table 3 above. In the present embodiment, "00B" and "00C" are inputted into the "procured part" field of procured part compatibility table for single item 13 and "##B" and "000C" are inputted into the "alternative" field. Further, "AssyA" is inputted into the "procured part" field in the procured part compatibility table for assembly 14, and "AssyD" is inputted into the "alternative" field.

Next, for the component parts of the assembly part which is the procured part, acquisition of single-item part structure information (step S44), extraction of parts with similar structures (steps S45 and S46), extraction of mounting compatibility (step S47), input of information about additional work (step S48), acquisition of information about additional work and the like (step S49) and additional input of the acquired information to the procured part compatibility table for single item 13 (step S50) are performed. Since the flow from step S44 to step S50 is the same as the flow from step S34 to step S40 described above, only different parts as specific examples in FIGS. 6 and 8 will be described below.

In the present embodiment, as shown in the acquisition of single-item part structure information (S44) in FIG. 8, an almost disc-shaped structure having a notch on a part thereof is extracted for "00B" which is a component part of "AssyA". As the structure of "00C" which is a component part of "AssyA", a triangular-plate-shaped structure is extracted.

Then, when similar structure search (steps S44 to S48 in FIG. 8) is performed, "10B" which is different from "00B" in color, "20B" and "10B" which are disc-shaped parts, and "30B" which is an almost disc-shaped part and different from "10B" in dimensions are extracted; and "10B" and "20B" are selected as parts that can be used as alternative parts. After that, as for "20B" which is a disc-shaped part, since additional work is required, information about the additional work and the like is acquired (step S49 in FIG. 8). Then, "10B", "20B" and the additional work information about "20B" are additionally inputted to the procured part compatibility table for single item 13 (step S50 in FIG. 8), and creation of the procured part compatibility table for single item 13 is completed.

After the creation of the procured part compatibility table for single item 13 is completed, search for other assembly parts the configurations of which are similar to the configuration of the assembly part which is the procured part is performed (step S51). Specifically, as shown in FIG. 9, search for not only assembly parts having configurations similar to the configuration of the assembly part which is the procured part but also assembly parts having configurations in which a component part of the assembly part is replaced with an alternative part is performed. In the present embodiment, "AssyF", "AssyG", "AssyH" and "AssyJ" are extracted as assembly parts having configurations similar to the configuration of "AssyA" and a configuration in which a component part of "AssyA" is substituted with "10B", "20B", "##B" or "000C".

Here, "AssyF" is provided with two "00B's" and one "000C" as component parts. Further, "AssyG" is provided two "20B's", one "00C" and one "11D" as component parts. Furthermore, "AssyH" is provided one "10B", one "000C" and one "11D" as component parts. Further, "AssyJ" is provided one "10B", one "000C", one "11D" and three "222Z's" as component parts.

Next, degrees of similarity between the assembly part which is the procured part and the other assembly parts extracted as having similar configurations are calculated (step S52). Specifically, as for the same configuration as the assembly part which is the procured part or a configuration in which a component part of the assembly part is substituted with an alternative part as described above, the similarity degree is 100%. If a single-item part different from a component part of the assembly part which is the procured part (excluding alternative parts) is included, or if a component part or an alternative part of the assembly part which is the procured part is missing, the similarity degree decreases according to the number of missing parts. A level of decrease in the similarity degree due to existence of a missing part or being provided with a different single-item part is decided in advance and is automatically calculated by executing the applied part decision program 11.

In the present embodiment, since "AssyF" is provided with two "00B's" that are the same as a component part of "AssyA" and is provided with one "000C" that is an alternative part of "00C", the similarity degree is 100%. Since "AssyG" is provided with one "11D" that is not included in the component parts and alternative parts of "AssyA", the similarity degree decreases and is judged to be 75%. Further, "AssyH" is provided with one "11D" that is not included in the component parts and alternative parts of "AssyA", and lacks one "10B" which is an alternative part of "00B" which is a component part of "AssyA". Therefore, the similarity degree of "AssyH" further decreases and judged to be 66%. Further, "AssyJ" is provided with one "11D" and three "222Z's" that are not included in the component parts and alternative parts of "AssyA", and lacks one "10B" which is an alternative part of "00B" which is a component part of "AssyA". Therefore, the similarity degree of "AssyJ" further decreases and judged to be 33%.

Though the similarity degree is judged according to the number of component parts or alternative parts included in an assembly part in the example described above, a numerical value may be obtained based on the weight, cost and the like of a main part in an assembly part.

Next, assembly parts with high similarity degrees are selected (step S53). In the present embodiment, three parts "AssyF", "AssyG" and "AssyH" with high similarity degrees are selected. The number of selected parts is not limited to three. The number may be changed according to the number of parts extracted at step S53, or a fixed number may be selected.

Next, in comparison with the assembly part which is the procured part, information about missing parts is inputted for the selected other assembly parts with high similarity degrees (step S54). Then, the information about the missing parts for the selected other assembly parts with high similarity degrees is acquired (step S55). If there is not a missing part in any of the selected other assembly parts with high similarity degrees, the acquisition of information about missing parts at step S55 is not performed, and the flow proceeds to step S56. In the present embodiment, it is judged that "AssyH" lacks one "10B" which is an alternative part of "00B", and acquisition of missing part information about "10B" is performed.

Next, in the case of using any of the selected other assembly parts with high similarity degrees instead of the assembly part which is the procured part, information about additional work is inputted (step S56). Specifically, information about additional processing work required in the case of substituting another part for a component part of the assembly part which is the procured part is inputted. Then, when additional work is inputted for any one of the selected other assembly parts with high similarity degrees (step S56), information about the additional work, necessary skills and necessary tools is acquired (step S57). Specifically, as shown in FIG. 9, the information about additional work, necessary skills and necessary tools for a work target part in the alternative assembly part is acquired with reference to the part work information 24. If additional work is not required for any of the selected other assembly parts with high similarity degrees, the acquisition of information about additional work and the like at step S57 is not performed, and the flow proceeds to step S58.

In the present embodiment, in the case of using "AssyG" instead of "AssyA", it is judged that cutting work is required for "20B" which is a component part of "AssyG". Further, pieces of information of "cutting", "safety qualification A" and "grinder" are acquired as additional work information, a necessary skill and a necessary tool, respectively.

Next, after additional work information is acquired for all the selected other assembly parts with high similarity degrees at step S53 (step S56), and after the acquisition of information at step S57, additional input to the procured part compatibility table for assembly 14 is performed (step S58). Specifically, other assembly parts that can be used instead of the assembly part which is the procured part are additionally inputted, and information about additional work and the like for the additionally inputted assembly parts is also additionally inputted. In the present embodiment, "AssyF, "AssyG" and "AssyH" are added to the procured part compatibility table for assembly 14 as alternative parts, and various kinds of information such as additional work about "AssyG" is also added. Then, creation of the procured part compatibility table for assembly 14 is completed. Since "AssyH" is judged to lack one "10B", "AssyH+10B" is additionally inputted into the "alternative" field.

Details of Procured Part Compatibility Table for Disassembly

Figure 10:
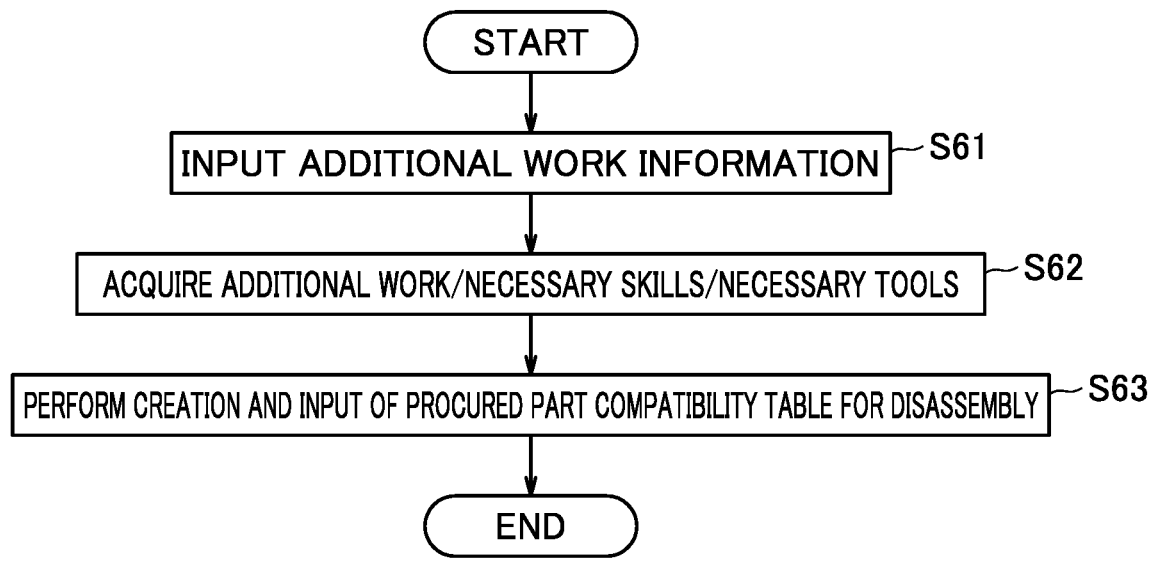
FIG. 10 is a process flowchart in creation of a procured part compatibility table for disassembly in FIG. 4.
Figure 11:
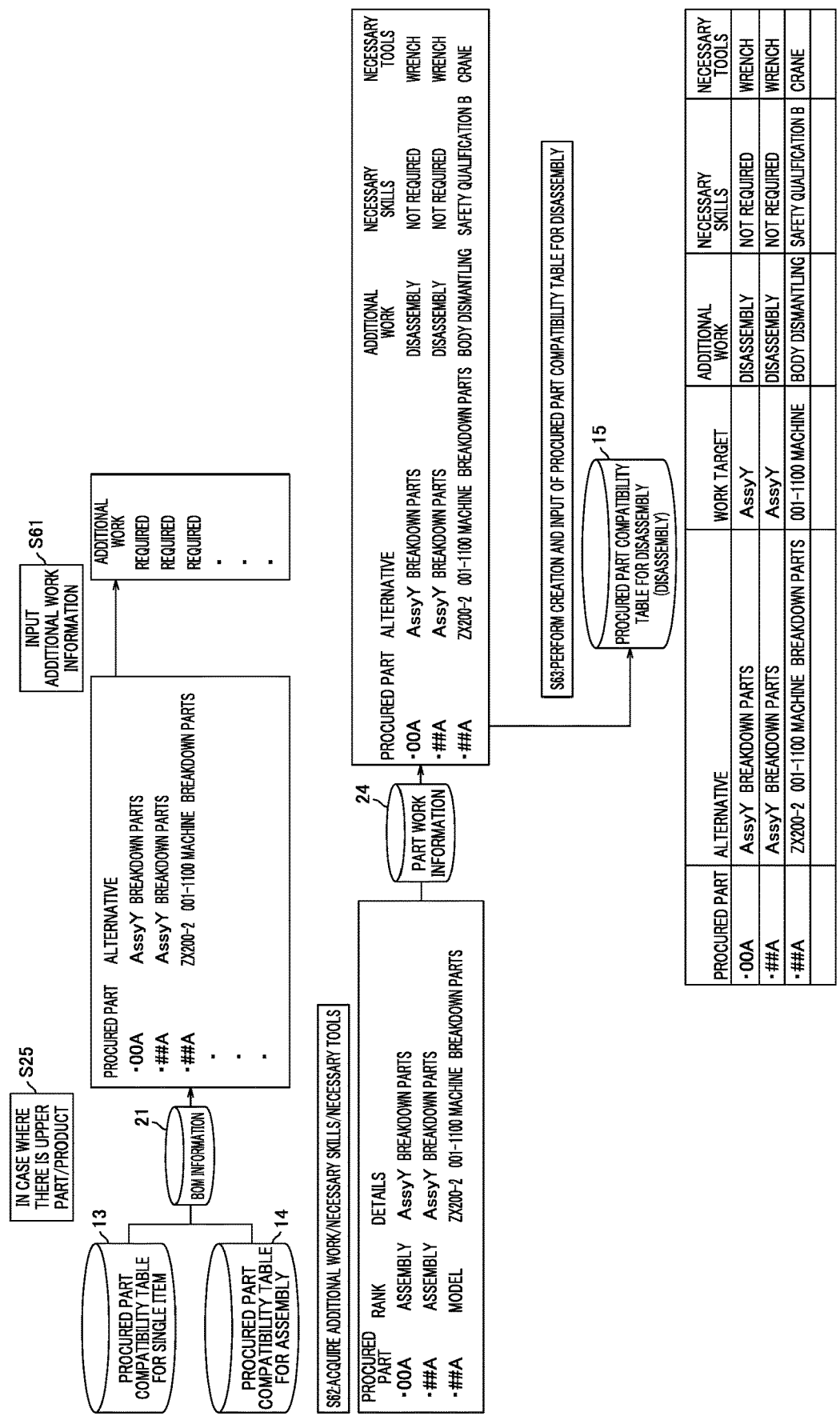
FIG. 11 is a conceptual diagram for illustrating a process flow in the creation of the procured part compatibility table for disassembly in FIG. 4.

Next, the process in the creation of the procured part compatibility table for disassembly in FIG. 4 (step S26) will be described in detail with reference to FIGS. 10 and 11. FIG. 10 is a process flowchart in the creation of the procured part compatibility table for disassembly in FIG. 4 (step S26). FIG. 11 is a conceptual diagram for illustrating a process flow in the creation of the procured part compatibility table for disassembly in FIG. 4 (step S26).

First, as shown in step S25 in FIG. 4, it is judged whether an upper part/product provided with the procured part exists or not. The judgment is performed with reference to the procured part compatibility table for single item 13 and the procured part compatibility table for assembly 14 completed at the table creation steps described above and the BOM information 21. That is, not only negative development of the procured part is performed but also negative development of alternative parts (including component parts) that can be used instead of the procured part is also performed. In FIG. 11, for "00A" and "##A", information about substitutable parts is acquired.

Next, if it is judged that an upper part/product exists, at step S25 in FIG. 4, information about additional work is inputted at the time of using an alternative part instead of the procured part (step S61). Then, from the additional work information inputted at step S61, information about the additional work, necessary skills and necessary tools is acquired (step S62).

Specifically, as shown in FIG. 11, the information about the additional work, the necessary skills and the necessary tools for the alternative part is acquired with reference to the part work information 24. In the present embodiment, in the case of acquiring "00A" or "##A", which is the procured part, from "AssyY", information of "disassembly" as additional work, "not required" as the requires skills and "wrench" as the necessary tools is acquired. Further, in the case of acquiring "##A", which is the procured part, from "ZX200-2 001-1100 machine", information of "main body dismantling" as additional work, "safety qualification B" as the requires skills and "crane" as the necessary tools is acquired.

Next, after the acquisition of the additional work information at step S62, creation of and additional input to the procured part compatibility table for disassembly 15 is performed (step S63). Specifically, as shown in FIG. 11, for each of "00A" and "##A", an upper part/product thereof is written in the "alternative" field, and various kinds of information is inputted into the "additional work", "necessary skills" and "necessary tools" fields in the case of substituting the upper part/product.

Details of Information Addition

Next, the process in the information addition in FIG. 4 (step S28) will be described in detail with reference to FIGS. 12 to 15. Here, FIGS. 12 to 15 are detailed process flows based on various kinds of conditions in the information addition in FIG. 4 (step S28).

Figure 12:
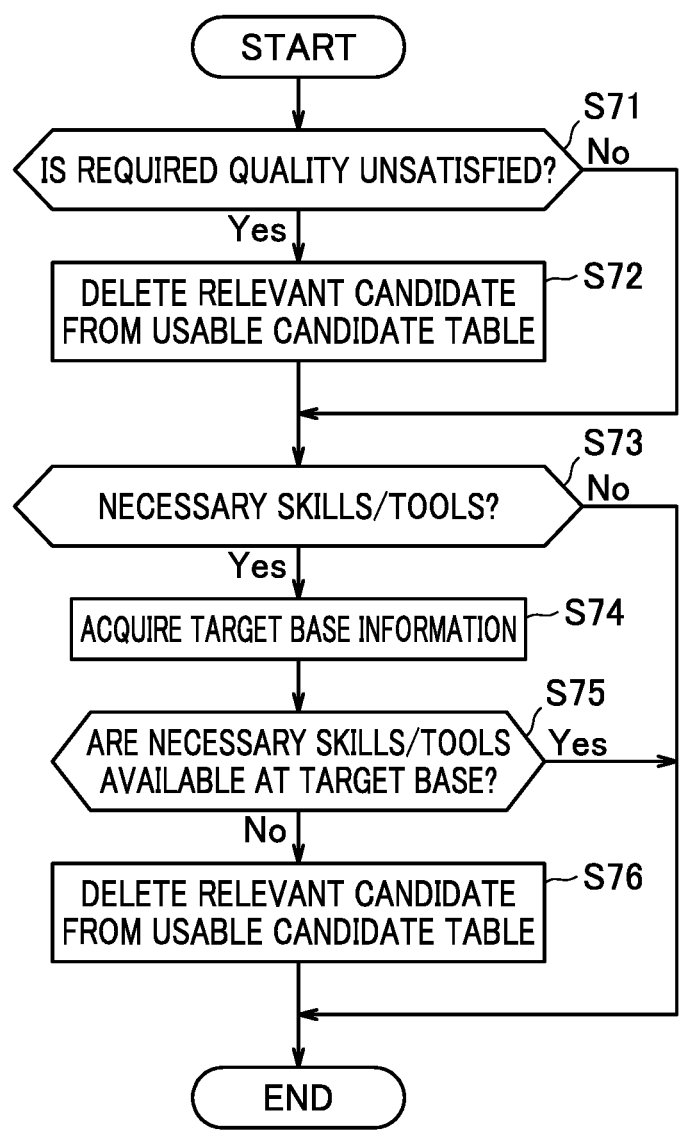
FIG. 12 is a process flowchart in information addition in FIG. 4.

In a process flow shown in FIG. 12, it is judged first whether or not each candidate in the usable candidate table 12 satisfies a required quality inputted by the operator of the terminal 2 (step S71). In the present embodiment, it is judged whether or not each candidate in the usable candidate table 12 created at step S17 satisfies conditions selected from Table 2. Then, if there is at least one candidate that does not satisfy the required quality (step S71: Yes), the relevant candidate in the usable candidate table 12 is deleted (step S72). If there is not a candidate that does not satisfy the required quality (step S71: No), the flow proceeds to step S73.

Next, for each candidate in the usable candidate table 12, it is judged whether necessary skills and necessary tools are required or not (step S73). Specifically, such a candidate that predetermined information is written in the "necessary skills" and "necessary tools" fields of the usable candidate table 12 requires necessary skills and necessary tools. If there are candidates (at least one candidate) that require necessary skills and necessary tools among the candidates in the usable candidate table 12 (step S73: Yes), target base information is acquired (step S74). Specifically, information about the base requiring the procured part is acquired with reference to the base work information 35 in the file server 3. If there is not a candidate that requires necessary skills and necessary tools among the candidates in the usable candidate table 12, the flow ends.

Next, it is judged whether or not the necessary skills and the necessary tools for each candidate in the usable candidate table 12 are available at the base requiring the procured part (step S75). Specifically, it is judged whether or not there is a worker having the necessary skills at the base requiring the procured part and whether or not there are tools for performing work at the base. If the skills and the tools are not available (step S75: No), the candidate in the usable candidate table 12 is deleted (step S76). If the skills and the tools are available (step S75: Yes), the flow ends.

Though an unnecessary candidate is deleted from the usable candidate table 12 in the present embodiment, a check field for indicating being not usable may be added to the usable candidate table 12 so that, by checking the check field, a corresponding candidate is excluded from the candidates. The usable candidate table 12 may be processed so that a candidate that cannot be actually used cannot be selected.

Figure 13:
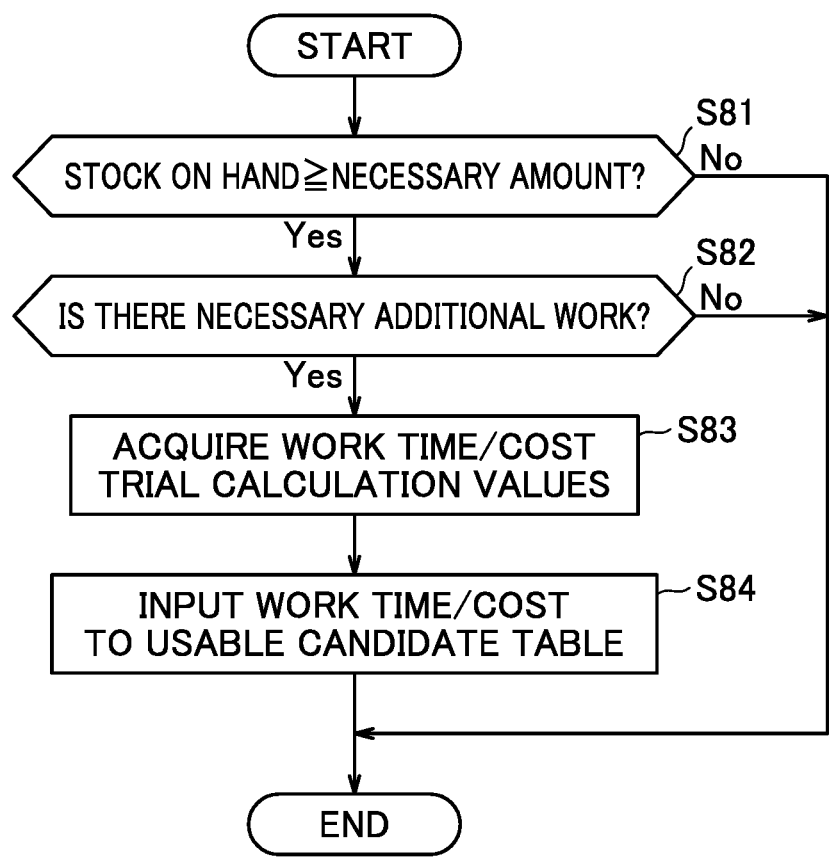
FIG. 13 is a process flowchart in the information addition in FIG. 4.

In a process flow shown in FIG. 13, it is judged first whether or not there is a necessary amount of stock on hand or more at the base requiring the procured part (step S81). Specifically, it is judged whether the used number of used parts of each candidate in the usable candidate table 12 is sufficient or not with reference to the base's stock information 31 in the file server 3. Here, if the stock on hand is below the necessary amount (step S81: No), the present flow ends.

On the other hand, if the stock on hand is equal to or above the necessary amount (step S81: Yes), it is judged whether or not there is necessary additional work at the base requiring the procured part (step S82). Specifically, such a candidate that predetermined information is written in the "work" field in the usable candidate table 12 requires additional work. If there is at least one candidate that requires additional work (step S82: Yes), work time/cost trial calculation values for the relevant candidate are acquired with reference to the work time/cost trial calculation information 37 stored in the file server 3 (step S83). If there is not a candidate that requires additional work (step S82: No), the present flow ends.

When the work time/cost trial calculation values of the candidate for which necessary additional work is required are acquired, various kinds of numerical values are additionally inputted into the "lead time" and "cost" fields of the usable candidate table 12 (step S84). In the present embodiment, each of the "lead time" and "cost" fields is separated in two in the usable candidate table 12. Specifically, lead time is classified in lead time for additional work such as processing (LTa) and lead time for others (LTb), and cost is classified in cost for the additional work such as processing (cost a) and cost for others (cost b). Therefore, in the additional input at step 84, numerical values are added into the "LTa" and "cost b" fields. The classification of the lead time and the cost is not limited to two kinds but may be classified into three or more from a view point of various kinds of work.

In the present embodiment, as seen from Table 7 above, numerical values are added into the "LTa" and "cost b" fields of a candidate number 3 for which a part is prepared at the own base.

Figure 14:
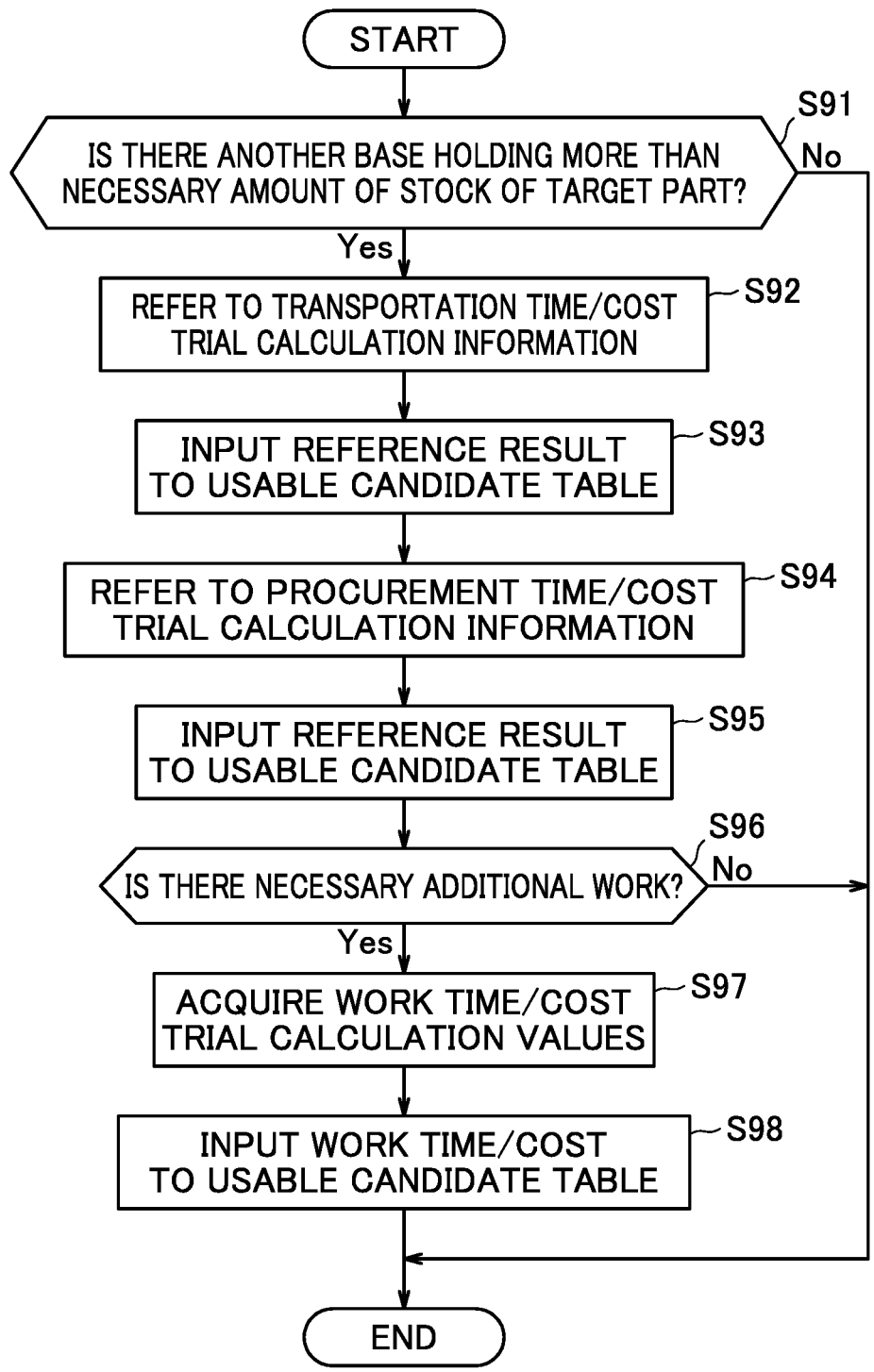
FIG. 14 is a process flowchart in the information addition in FIG. 4.

In a process flow shown in FIG. 14, it is judged first whether or not there is more than a necessary amount of stock on hand at other bases different from the base requiring the procured part (step S91). Specifically, it is judged whether the used number of used parts of each candidate in the usable candidate table 12 is sufficient or not with reference to the other bases' stock information 32 in the file server 3. Here, if the stock is below the necessary amount (step S91: No), the present flow ends.

If the used number of used parts of each candidate in the usable candidate table 12 is sufficient at the other bases (step S91), the transportation time/cost trial calculation information 38 in the file server 3 is referred to (step S92). Then, various kinds of numerical values, which are a result of the reference, are additionally inputted into the "LTb" and "cost b" fields in the usable candidate table 12 (step S93).

Next, the procurement time/cost trial calculation information 39 in the file server 3 is referred to (step S94). Then, various kinds of numerical values, which are a result of the reference, are added to numerical values in the "LTb" and "cost b" fields in the usable candidate table 12 (step S95).

Next, it is judged whether there is necessary additional work at the other bases (step S96). Specifically, such a candidate that predetermined information is written in the "work" field in the usable candidate table 12 requires additional work. If there are candidates (at least one candidate) that require additional work (step S96: Yes), work time/cost trial calculation values for the relevant additional work are acquired with reference to the work time/cost trial calculation information 37 stored in the file server 3 (step S97). If there is not a candidate that requires additional work (step S96: No), the present flow ends.

When the work time/cost trial calculation values of the candidates for which necessary additional work is required at the other bases are acquired, various kinds of numerical values are additionally inputted into the "lead time" and "cost" fields of the usable candidate table 12 (step S98). In the present embodiment, numerical values are added into the "LTa" and "cost a" fields of candidate numbers 1 and 2 for which orders are to be made from other bases as seen from Table 7 above.

Figure 15:
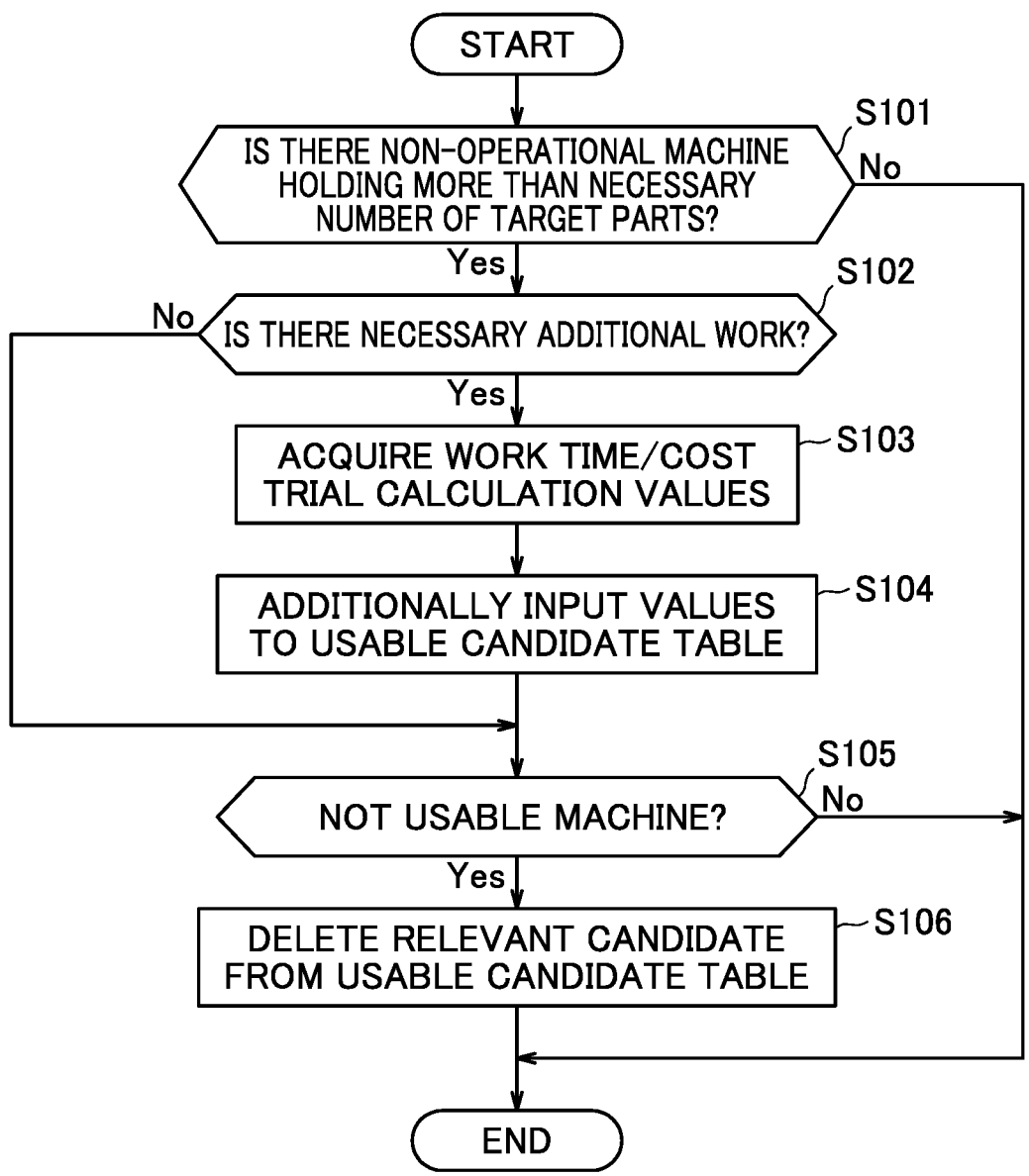
FIG. 15 is a process flowchart in the information addition in FIG. 4.

Next, as in a process flow shown in FIG. 15, it is judged whether or not there is a non-operational machine holding more than a necessary number of procured parts (step S101). Specifically, the operation information 33 stored in the file server 3 is referred to, and it is judged whether or not there is a non-operational machine holding more than a necessary number of procured parts.

Next, it is judged whether or not there is necessary additional work at the time of using a non-operational machine (step S102). Specifically, such a candidate that predetermined information is written in the "work" field in the usable candidate table 12 requires additional work. If at least one candidate that requires additional work (step S102: Yes), work time/cost trial calculation values for the relevant candidate are acquired with reference to the work time/cost trial calculation information 37 stored in the file server 3 (step S103). If there is not a candidate that requires additional work (step S102: No), the flow proceeds to step S105.

When the work time/cost trial calculation values of the candidate for which necessary additional work is required at the time of using a non-operational machine are acquired, various kinds of numerical values are additionally inputted into the "lead time" and "cost" fields of the usable candidate table 12 (step S104). In the present embodiment, numerical values are inputted into the "LTa" and "cost a" fields of a candidate number 5 for which a non-operational machine is used as seen from Table 7 above.

If there is not a candidate for which additional work is required (step S102: No), and after additional input to the usable candidate table 12 is performed (step S104), the usability information 34 stored in the file server 3 is referred to, and it is judged whether or not the target non-operational machine is actually usable as a part procurement source (step S105). For example, it is judged that, though a non-operational machine of the customer himself for whom the part is currently to be procured and a non-operational machine held by a manufacturer or an agency is usable as a part procurement source, a machine held by another customer is judged not to be usable. If a target non-operational machine is judged not to be actually usable (step S105: Yes), the relevant candidate is deleted from the usable candidate table 12 (step S106). On the other hand, if a target non-operational machine is judged to be actually usable (step S105: No), the present flow ends.

After each of the flows ends, the information adding portion 43 calculates total LT from LTa and LTb in the usable candidate table 12 and additionally inputs the total LT. Further, the information adding portion 43 calculates total cost from the cost a and the cost b in the usable candidate table 12 and additionally inputs the total cost.

As for the flows in FIGS. 12 to 15, any of the flows may be started first. The judgment about required quality in FIG. 12 (steps S71 and S72) may be performed in the flows in FIGS. 13 to 15.

Details of Judgment

Figure 16:
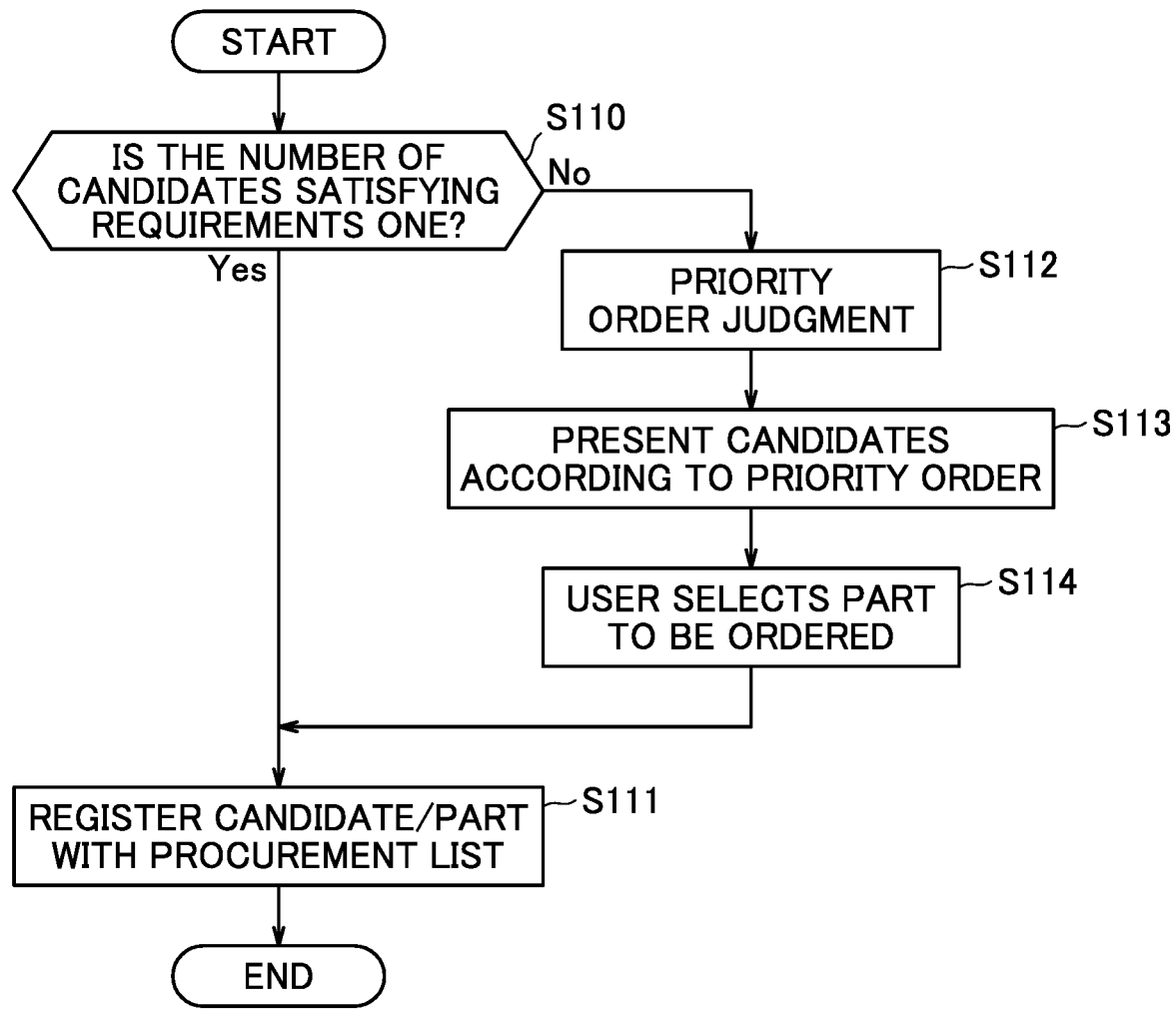
FIG. 16 is a process flowchart in judgment in FIG. 4.
Figure 17:
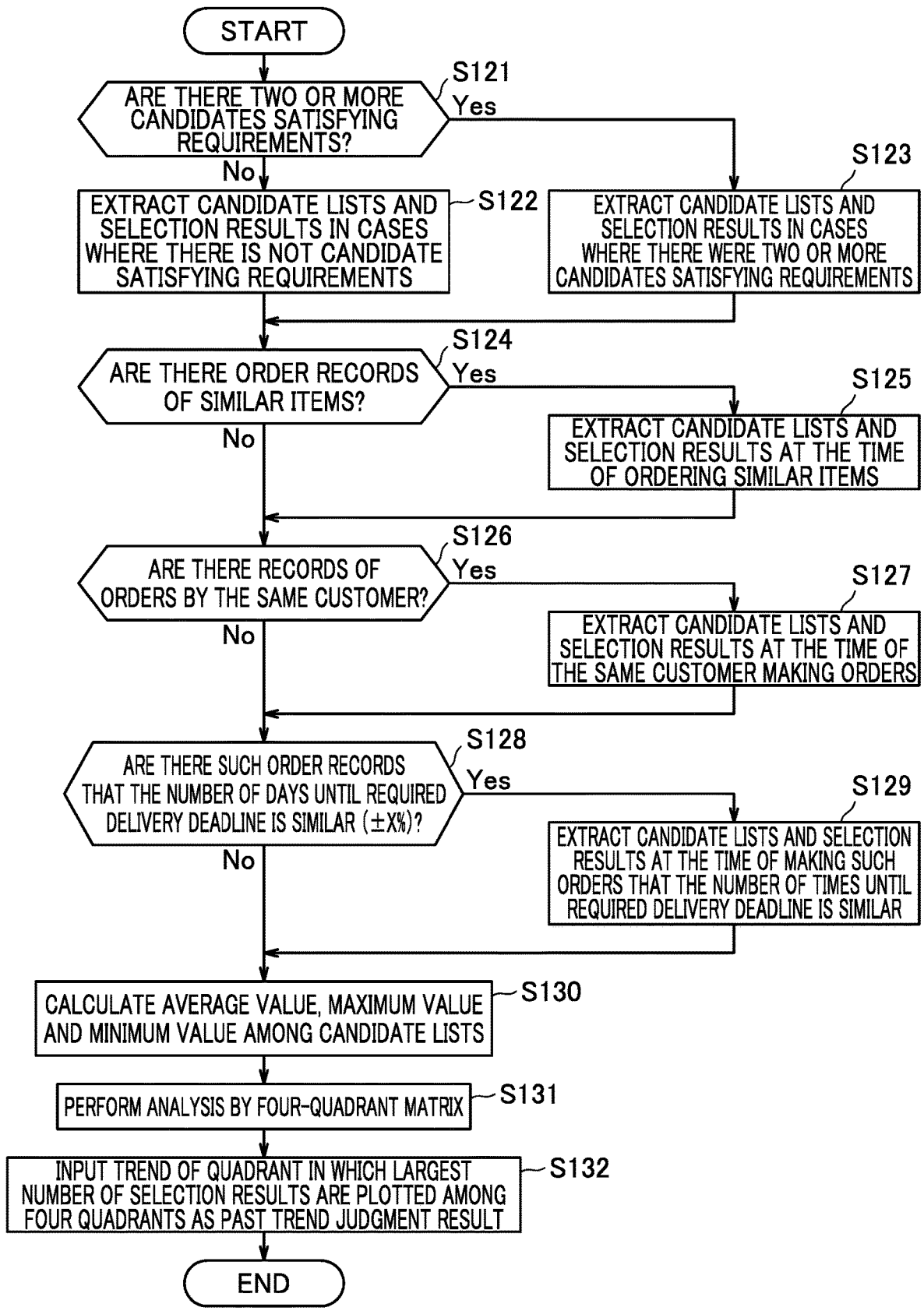
FIG. 17 is a detailed process flowchart in past trend judgment in FIG. 16.
Figure 18:
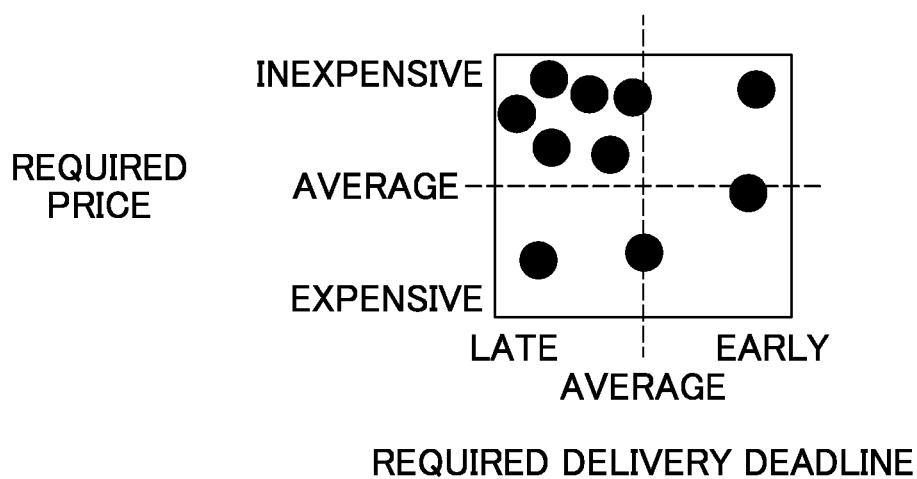
FIG. 18 is a four-quadrant matrix diagram used for the past trend judgment in FIG. 16.

Next, the process in the judgment in FIG. 4 (step S29) will be described in detail with reference to FIGS. 16 to 18. Here, FIG. 16 is a process flowchart in the judgment in FIG. 4 (step S29). FIG. 17 is a detailed process flowchart in past trend judgment in FIG. 16. FIG. 18 is a four-quadrant matrix diagram for illustrating the past trend judgment in FIG. 16.

First, it is judged whether or not the number of candidates satisfying the required price and the required quality (that is, requirements) shown in Table 1 above is one in the usable candidate table 12 that is in a state of being updated by the information addition (step S28) (step 5110). If the number of candidates satisfying the requirements is one, the candidate is immediately registered with a procurement list (step S111).

On the other hand, if there are a plurality of candidates satisfying the requirements, the flow proceeds to step S112, where a process for priority order judgment is performed. When the priority order judgment is performed, priority order is given to the candidates in the usable candidate table 12, and candidates are re-extracted and presented according to the priority order (step S113). That is, the candidates in the usable candidate table 12 are re-arranged in descending order of priority; unnecessary candidates are deleted; and the table is displayed on the display device 8 as a final candidate table. For example, the usable candidate table 12 shown as Table 7 above may be displayed as the final candidate table shown as Table 8 below. In Table 8, selection and re-arrangement are performed, giving priority to a degree of emergency and lead time.

The process from the judgment about whether a single-item or not at step S22 in FIG. 4 up to the re-extraction performed based on the above priority order corresponds to a candidate part extracting step of extracting candidate parts including candidates for a part required by a customer and alternatives for the part based on each piece of information inputted at the input step. Further, displaying a result after the extraction on the display device 8 as a final candidate table corresponds to an output step of outputting a signal for displaying the candidate parts extracted at the candidate part extracting step on the display device 8.

[Table 8]

TABLE 8

| CANDIDATE NUMBER | CONTENT OF CANDIDATE | USED PART | NUMBER USED | ORDERED PART | KIND OF ORDER | WORK TARGET | WORK | QUANTITY |
|---|---|---|---|---|---|---|---|---|
| | | | | FINAL CANDIDATE TABLE (STEP S1 13) | | | | |
| 1 | URGENTLY ORDER AssyA | AssyA | 1 | AssyA | URGENT | | | 1 |
| 2 | ACQUIRE FROM NON- | | | | | NO. XX1-30001 | DISMANTLING | 1 |

TABLE 8-continued

| 3 | OPERATIONAL MACHINE NORMALLY ORDER AssyA | AssyA | 1 | AssyA | NORMAL | | | 1 |

FINAL CANDIDATE TABLE (STEP S1 13)

| CANDIDATE NUMBER | LTa | LTb | TOTAL LT | COSTa | COSTb | TOTAL COST | NECESSARY SKILL | NECESSARY TOOL |
|---|---|---|---|---|---|---|---|---|
| 1 | 100 | 50 | 150 | 100 | 50 | 150 | | |
| 2 | 40 | | 40 | 1000 | | 1000 | SAFETY QUALIFICATION B | CRANE WORKPLACE |
| 3 | 1000 | 50 | 1050 | 1000 | 50 | 1050 | | |

Next, the operator of the terminal 2 selects one part from the final candidate table displayed on the display device 8 (step S114), and the selected part is registered with the procurement list (step S111). That is, the operator of the terminal 2 can select an optimal part from among a plurality of candidates suitable for the requirements, in consideration of other conditions and the like.

The priority order judgment is to give priority order to the candidates in the usable candidate table 12 from a plurality of candidates satisfying the requirements, according to order of items selected by the operator of the terminal 2 from among "cost", "delivery deadline" (emergency degree) and "quality" (whether genuine or not). The priority order judgment includes the past trend judgment shown in FIG. 17. Here, the past trend judgment is not essential, and it is possible to give priority order to the candidates in the usable candidate table 12, attaching importance to cost, delivery deadline (emergency degree) or quality. That is, if the operator of the terminal 2 attaches importance to an item he has selected, priority order is decided without performing the past trend judgment. On the other hand, if the operator of the terminal 2 desires to attach importance to past trends, priority order is decided based on a result of the past trend judgment in addition to cost, delivery deadline (emergency degree) or quality (whether genuine or not).

Next, in the past trend judgment, it is judged first whether there are two or more candidates satisfying the requirements as shown in FIG. 17 (step S121). That is, for a case where there is not a candidate satisfying the requirements (step S121: No) and a case where there are a plurality of such candidates (step S121: Yes), the following step is performed separately for each of the two cases.

Specifically, if there is not a candidate satisfying the requirements, the past procurement record information included in the past information 25 is referred to, and past candidate lists and selection records in cases where requirements were not satisfied are extracted (step S122). That is, past records are referred to, and information about what kind of part procurement was performed in cases where there was not a candidate satisfying requirements similarly to the current case is acquired.

On the other hand, if there are a plurality of candidates satisfying the requirements, the past procurement record information included in the past information 25 is referred to, and past candidate lists and selection records in cases where there were a plurality of candidates (step S123). That is, past records are referred to, and information about what kind of part procurement was performed in the cases where there were a plurality of candidates satisfying requirements similarly to the current case is acquired.

Next, it is judged whether there are order records of items similar to the current procured part based on the candidate lists and selection results extracted at step S122 or S123 (step S124). Specifically, it is judged whether or not there is past order record information about parts similar to the current procured part, including order records of other customers, and whether or not the orders of the parts similar to the current procured part were made twice or more. If there are order records of items similar to the current procured part (step S24: Yes), candidate lists and selection results at the time of ordering the similar items are extracted (step S125). Specifically, usable candidate tables 12 formed at the time of ordering the similar items in the past and results of final selection from the usable candidate tables 12 are extracted.

If it is judged that there is not an order record of an item similar to the current procured part (step S124: No), and after candidate lists and selection results at the time of ordering similar items are extracted, it is judged whether or not there are order records of the same customer based on the candidate lists and selection results extracted at step S122 or S123 (step S126). Specifically, it is judged whether or not orders by the same person as the current orderer have been made in the past, based on past order record information about the same customer as the orderer of the current ordered part, and the candidate lists and selection results extracted at step S122 or S123. If there are order records of the same customer in the past (step S126: Yes), candidate lists and selection results at the time of the same customer making the orders in the past are extracted (step S127). Specifically, usable candidate tables 12 formed at the time of the same customer making the orders in the past and results of final selection from the usable candidate tables 12 are extracted.

If it is judged that there is not an order record of the same customer in the past (step S126: No), and after the candidate lists and the selection results at the time of the same customer making the orders in the past are extracted, it is judged whether or not there are such order records that the number of days until a required delivery deadline is similar, in the past, based on the candidate lists and selection results extracted at step S122 or S123 (step S128). Specifically, it is judged whether or not such orders that the delivery deadline is similar to the current delivery deadline have been made in the past, based on past order record information about delivery deadlines similar to the delivery deadline of the current ordered part, and the candidate lists and selection results extracted at step S122 or S123. If there are past order records with similar delivery deadlines (step S128: Yes), candidate lists and selection results at the time of making the orders with the similar delivery deadlines in the past are extracted (step S129). Specifically, usable candidate tables 12 in the past cases where the orders were made, the similar delivery deadlines being required, and results of final selection from the usable candidate tables 12 are extracted.

That the delivery deadline is similar means that, for example, a slight difference such as ±one day and ±a few percent is allowed.

If it is judged that there is not such an order record that the number of days until required delivery deadlines are similar, in the past (step S128: No), and after the candidate lists and the selection results at the time of making the orders with the similar delivery deadlines are extracted, an average value, a maximum value and a minimum value of the lead time and the cost are calculated among the extracted candidate lists (step S130). That is, from the candidate lists extracted at steps S122, S123, S125, S127 and S129 (that is, the usable candidate tables 12), the lead time and cost of each candidate is extracted, and the average value, the maximum value and the minimum value are calculated.

Next, from the calculated average value, maximum value and minimum value, and the extracted selection results, analysis by a four-quadrant matrix is performed (step S131). Specifically, a four-quadrant matrix is created, with the average values, maximum value and minimum values of the lead times and costs in the extracted candidate lists as 0, 1 and −1, respectively, and each selection result is plotted in the four-quadrant matrix.

Next, the trend of a quadrant in which the largest number of selection results are plotted in the four-quadrant matrix are inputted as a past trend judgment result (step S132). In FIG. 18, since the largest number of selection results are plotted in the second quadrant, a trend that the required delivery deadline is "late", and the required price is "low" is grasped as a trend in the past.

As described above, in the past trend judgment, a variety of judgments are made based on past records of the procured part, order records of parts similar to the current procured part, records of orders by the same person as the order of the current procured part, and order records with delivery deadlines similar to the required delivery deadline of the current procured part. That is, past trends are judged in consideration of not only past trends of the procured part but also items related to the procured part.

Though a four-quadrant matrix is created with the required price and the required delivery deadline being prioritized, in the present embodiment, a four-quadrant matrix may be created with the required price and the required quality being prioritized, or a four-quadrant matrix may be created with the required delivery deadline and the required quality being prioritized.

Further, though past trends are grasped by calculating an average value, a maximum value and a minimum value of lead times and costs, past trends may be grasped by relative values based on a required value.

Advantageous Effects of Embodiment

In the part procurement system and the part procurement method according to the present embodiment, CAD information and BOM information about various kinds of parts are used at the time of creating a usable candidate table. Thereby, not only the same part as a required part but also a compatible part, a part that can be substituted by processing, a part taken out from an existing upper product and the like can be applied, and it is possible to quickly cope with various malfunctions of a construction machine and shorten down time.

In the part procurement system and the part procurement method according to the present embodiment, if there are a plurality of candidates satisfying requirements of a procured part, the candidates are re-arranged according to past procurement record information about the procured part. Thereby, even if there are a plurality of candidates satisfying requirements, it is possible to propose various part procurement methods to a part procurer. Therefore, it becomes possible for the part procurer to perform optimal part procurement according to a use state of a construction apparatus requiring a part. That is, it is possible to quickly cope with various malfunctions of a construction machine and shorten down time.

In the part procurement system and the part procurement method according to the present embodiment, even if there is not a candidate satisfying requirements of a procured part, candidate lists and selection results in cases where there is not a candidate satisfying requirements in the past are used to re-arrange candidates. Thereby, even if there is not a candidate satisfying requirements, it is possible to propose various part procurement methods to a part procurer similarly to a case where there is a candidate satisfying the requirements of a procured part. Therefore, it becomes possible for the part procurer to perform optimal part procurement according to a use state of a construction apparatus requiring a part. That is, it is possible to quickly cope with various malfunctions of a construction machine and shorten down time.

Furthermore, in the part procurement system and the part procurement method according to the present embodiment, if there are a plurality of candidates satisfying requirements of a procured part, candidates in an usable candidate table are extracted according to priority order, with reference to past order record information about items similar to the procured part, past order record information about the same customer as the orderer of the procured part and past order record information about delivery deadlines similar to the delivery deadline of the procured part. That is, at the time of using past records, the past records are reviewed not only from information about the same part but also from viewpoints of similar part, customer and delivery deadline. Therefore, it is possible to more accurately propose various part procurement methods to a part procurer, standing in the position of the part procurer, and it becomes possible for the part procurer to perform more optimal part procurement according to a use state of a construction apparatus requiring a part.

In the part procurement system and the part procurement method according to the present embodiment, even if there is not a candidate satisfying requirements of a procured part, candidates in an usable candidate table are extracted according to priority order, with reference to past order record information about items similar to the procured part, past order record information about the same customer as the orderer of the procured part and past order record information about delivery deadlines similar to the delivery deadline of the procured part. That is, at the time of using past records, the past records are reviewed not only from information about the same part but also from viewpoints of similar part, customer and delivery deadline. Thereby, even if there is not a candidate satisfying requirements of a procured part, it is possible to more accurately propose various part procurement methods to a part procurer, standing in the position of the part procurer similarly to the case where there is a candidate satisfying the requirements of a procured part, and it becomes possible for the part procurer to perform more optimal part procurement according to a use state of a construction apparatus requiring a part.

Though, in the embodiment described above, the same part as a procured part or an alternative part such as a part with a similar structure or a part with a similar configuration is ordered, and procurement of a part used or stored in an agency or the like is assumed. However, par procurement is not limited to such part procurement. Part procurement via a route different from a regular procurement route, such as purchase of a part at a home center or the like, may be performed. In such a case, the past information 25 may include a record of the procurement via the irregular route. At a step of creating each procured part compatibility table, the procured part compatibility table may be created in consideration of such procurement record via an irregular route.

EXPLANATION OF REFERENCE SIGNS 1 part procurement system
3 file server
5a inputting portion
5b calculating portion
5e outputting portion
6 data input device
8 display device
12 usable candidate table
13 procured part compatibility table for single item (procured part compatibility table)
14 procured part compatibility table for assembly (procured part compatibility table)
15 procured part compatibility table for disassembly (procured part compatibility table)
21 BOM information
22 CAD information
25 past information (past procurement record information)
42 table creating portion
43 information adding portion
44 judging portion

The invention claimed is:

1. A part procurement system for a construction machine comprising a file server, a terminal having a display device, a data input device and a control device and a communication device for communicating between the file server and the terminal, and performing procurement of a part required by a customer, wherein
the file server stores BOM information that is part table information, CAD information that is computer-aided design information, part compatibility information, stock information and information about costs,
the control device of the terminal includes:
a table creating portion which creates a usable candidate table that lists candidates for preparing a required part from a procured part compatibility table for single item including a part compatible with a procured part when a required part is a single-item part, a procured part compatibility table for assembly including an assembly part compatible with the procured part when a required part is an assembly part, and a procured part compatibility table for disassembly including an alternative part that can be used in place of the procured part when there is an upper part or an upper product containing the procured part, based on customer's requirements information about the procured part inputted via a data input device, and the BOM information, the CAD information and the part compatibility information inputted from the file server;
an information adding portion which adds stock information, cost, lead time and additional work information about processing required to a part with mounting compatibility and a part that can be used as the alternative part to a part listed in the usable candidate table created by the control device;
a judging portion which extracts candidate parts including candidates for the part and alternatives for the part satisfying the requirements with the required information regarding the procured part inputted via the data input device as the requirements from the usable candidate table to which the information is added by the information adding portion; and
an outputting portion which outputs a signal for displaying the extracted candidate parts on a display device as a final candidate table based on the usable candidate table to which the information is added.

2. The part procurement system according to claim 1, wherein the control device extracts or re-arranges the candidate parts based on past order record information about parts similar to the part required by the customer or past order record information about parts ordered by the customer in the past, which are stored in the file server.

3. The part procurement system according to claim 2, wherein the control device extracts a past trend list based on the past order record information about the parts similar to the part required by the customer or the past order record information about the parts ordered by the customer in the past, which are stored in the file server, and decides priority order of the candidate parts based on priority in the past trend list.

4. The part procurement system according to claim 3, wherein the control device performs plotting from the past trend list on a graph formed based on a desired priority to decide the priority.

5. The part procurement system according to claim 4, wherein the priority is selected from among a required price, a required delivery deadline and a quality for the procured part.

6. The part procurement system according to claim 1, wherein the control device creates a procured part compatibility table according to a classification of the procured part and creates the usable candidate table based on the procured part compatibility table.

7. The part procurement system according to claim 1, wherein the requirements information includes a part number, a quantity, a delivery deadline, a required price and a quality for the procured part.

8. A part procurement method for procuring a part required by a customer, having a file server storing BOM information that is part table information, CAD information that is computer-aided design information, part compatibility information, stock information and information about costs, a terminal having a display device, a data input device and a control device, and a communication device for communicating between the file server and the terminal,
the control device of the terminal comprising:
a table creating step of creating a usable candidate table that lists candidates for preparing a required part from a procured part compatibility table for single item including a part compatible with a procured part when a required part is a single-item part, a procured part compatibility table for assembly including an assembly part compatible with the procured part when a required part is an assembly part, and a procured part compatibility table for disassembly including an alternative part that can be used in place of the procured part when there is an upper part or an upper product containing the procured part, based on customer's requirements information about the procured part inputted via a data input device, and the BOM information, the CAD information and the part compatibility information inputted from the file server, an information adding step of adding stock information, cost, lead time and additional work information about processing required to a part with mounting compatibility and a part that can be used as the alternative part to a part listed in the usable candidate table created by the control device, a judging step of extracting candidate parts including candidates for the part and alternatives for the part satisfying the requirements with the required information regarding the procured part inputted via the data input device as the requirements from the usable candidate table to which the information is added by the information adding step, and an outputting step of outputting a signal for displaying the extracted candidate parts on a display device as a final candidate table based on the usable candidate table to which the information is added.

\* \* \* \* \*